US012621194B2

(12) United States Patent
Kumari et al.

(10) Patent No.: US 12,621,194 B2
(45) Date of Patent: May 5, 2026

(54) ENHANCED INTEGRATED SENSING AND COMMUNICATIONS WAVEFORM

(71) Applicant: QUALCOMM Incorporated, San Diego, CA (US)

(72) Inventors: Preeti Kumari, San Diego, CA (US); Juergen Cezanne, Ocean Township, NJ (US); Kapil Gulati, Belle Mead, NJ (US); Gene Wesley Marsh, San Diego, CA (US); Timo Ville Vintola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/890,353

(22) Filed: Sep. 19, 2024

(65) Prior Publication Data

US 2026/0081814 A1 Mar. 19, 2026

(51) Int. Cl.
*H04L 27/26* (2006.01)

(52) U.S. Cl.
CPC ................................ *H04L 27/2601* (2013.01)

(58) Field of Classification Search
CPC ... G01S 7/00; G01S 7/02; G01S 7/288; G01S 7/292; G01S 13/32; G01S 13/36; G01S 13/58; G01S 13/76; H04B 1/00; H04B 1/69; H04B 1/0413; H04B 7/0456; H04J 13/00; H04L 7/06; H04L 27/26; H04L 7/2601
USPC .......... 242/90, 132, 159, 195; 375/219, 260, 375/262, 267, 295, 316
See application file for complete search history.

(56) References Cited

U.S. PATENT DOCUMENTS

| | | | | |
|---|---|---|---|---|
| 11,656,322 | B2 * | 5/2023 | Aydogdu | .............. G01S 13/343 342/60 |
| 2021/0076367 | A1 | 3/2021 | Bayesteh et al. | |
| 2023/0115807 | A1 * | 4/2023 | Bunsen | ................. G01S 13/343 342/128 |
| 2025/0251508 | A1 * | 8/2025 | Rafique | ................. G01S 13/765 |
| 2025/0300792 | A1 * | 9/2025 | Shahsavari | ........... H04L 5/0091 |
| 2025/0317256 | A1 * | 10/2025 | Yao | ......................... H04W 4/12 |

FOREIGN PATENT DOCUMENTS

WO 2023113930 A2 6/2023

OTHER PUBLICATIONS

International Search Report and Written Opinion—PCT/US2025/041797—ISA/EPO—Nov. 20, 2025.

* cited by examiner

*Primary Examiner* — Shawkat M Ali
(74) *Attorney, Agent, or Firm* — QUALCOMM Incorporated

(57) ABSTRACT

Various aspects of the present disclosure generally relate to wireless communication. In some aspects, a transmitter node may determine a set of parameters for a waveform to be transmitted by the transmitter node, wherein the waveform is to use an allocated bandwidth that is larger than a sweeping bandwidth of a frequency modulated continuous wave (FMCW) chirp. The transmitter node may transmit the waveform according to the set of parameters. Numerous other aspects are described.

30 Claims, 15 Drawing Sheets

600 ⟶

610 ~ Determine a set of parameters for a waveform to be transmitted by the transmitter node, wherein the waveform is to use an allocated bandwidth that is larger than a sweeping bandwidth of a frequency modulated continuous wave (FMCW) chirp 620 ~ Transmit the waveform according to the set of parameters Determine a set of parameters for a waveform to be transmitted by the transmitter node, wherein the waveform is to use an allocated bandwidth that is larger than a sweeping bandwidth of a frequency modulated continuous wave (FMCW) chirp Transmit the waveform according to the set of parameters

610

620

600

710 Determine a set of parameters for a waveform to be transmitted by a transmitter node, wherein the waveform is to use an allocated bandwidth that is larger than a sweeping bandwidth of a frequency modulated continuous wave (FMCW) chirp 720 Transmit information associated with the set of parameters for reception by the transmitter node

700

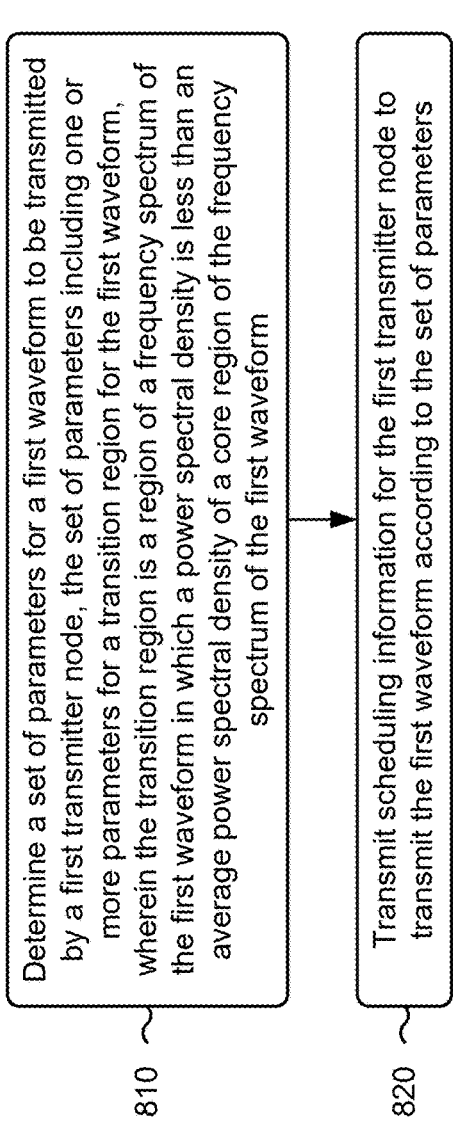

Determine a set of parameters for a first waveform to be transmitted by a first transmitter node, the set of parameters including one or more parameters for a transition region for the first waveform, wherein the transition region is a region of a frequency spectrum of the first waveform in which a power spectral density is less than an average power spectral density of a core region of the frequency spectrum of the first waveform

810

Transmit scheduling information for the first transmitter node to transmit the first waveform according to the set of parameters

820

800

FIG. 8

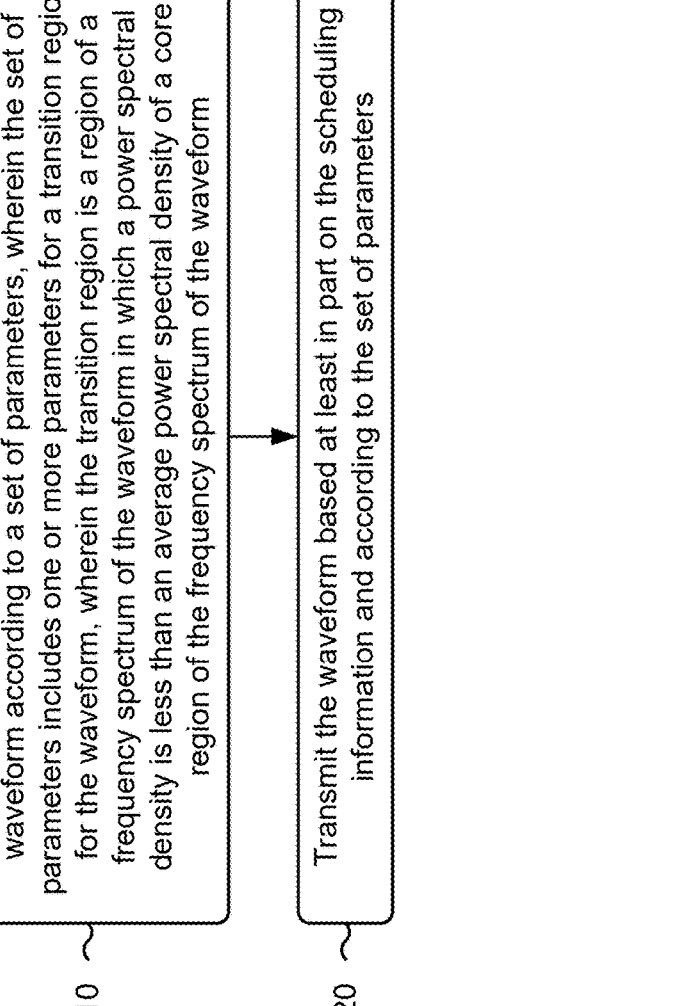

Receive scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform

910

Transmit the waveform based at least in part on the scheduling information and according to the set of parameters

ENHANCED INTEGRATED SENSING AND COMMUNICATIONS WAVEFORM

FIELD OF THE DISCLOSURE

Aspects of the present disclosure generally relate to wireless communication and specifically relate to techniques, apparatuses, and methods associated with an enhanced integrated sensing and communications waveform.

BACKGROUND

Wireless communication systems are widely deployed to provide various services, which may involve carrying or supporting voice, text, other messaging, video, data, and/or other traffic. Typical wireless communication systems may employ multiple-access radio access technologies (RATs) capable of supporting communication among multiple wireless communication devices including user devices or other devices by sharing the available system resources (for example, time domain resources, frequency domain resources, spatial domain resources, and/or device transmit power, among other examples). Such multiple-access RATs are supported by technological advancements that have been adopted in various telecommunication standards, which define common protocols that enable different wireless communication devices to communicate on a local, municipal, national, regional, or global level.

An example telecommunication standard is New Radio (NR). NR, which may also be referred to as 5G, is part of a continuous mobile broadband evolution promulgated by the Third Generation Partnership Project (3GPP). NR (and other RATs beyond NR) may be designed to better support enhanced mobile broadband (eMBB) access, Internet of things (IoT) networks or reduced capability device deployments, and ultra-reliable low latency communication (URLLC) applications. To support these verticals, NR systems may be designed to implement a modularized functional infrastructure, a disaggregated and service-based network architecture, network function virtualization, network slicing, multi-access edge computing, millimeter wave (mmWave) technologies including massive multiple-input multiple-output (MIMO), licensed and unlicensed spectrum access, non-terrestrial network (NTN) deployments, sidelink and other device-to-device direct communication technologies (for example, cellular vehicle-to-everything (CV2X) communication), multiple-subscriber implementations, high-precision positioning, and/or radio frequency (RF) sensing, among other examples. As the demand for connectivity continues to increase, further improvements in NR may be implemented, and other RATs, such as 6G and beyond, may be introduced to enable new applications and facilitate new use cases.

SUMMARY

Some aspects described herein relate to a method of wireless communication performed by a transmitter node. The method may include determining a set of parameters for a waveform to be transmitted by the transmitter node, where the waveform is to use an allocated bandwidth that is larger than a sweeping bandwidth of a frequency modulated continuous wave (FMCW) chirp. The method may include transmitting the waveform according to the set of parameters.

Some aspects described herein relate to a method of wireless communication performed by a network entity. The method may include determining a set of parameters for a waveform to be transmitted by a transmitter node, where the waveform is to use an allocated bandwidth that is larger than a sweeping bandwidth of an FMCW chirp. The method may include transmitting information associated with the set of parameters for reception by the transmitter node.

Some aspects described herein relate to a method of wireless communication performed by a network entity. The method may include determining a set of parameters for a first waveform to be transmitted by a first transmitter node, the set of parameters including one or more parameters for a transition region for the first waveform, where the transition region is a region of a frequency spectrum of the first waveform in which a power spectral density is less than an average power spectral density of a core region of the frequency spectrum of the first waveform. The method may include transmitting scheduling information for the first transmitter node to transmit the first waveform according to the set of parameters.

Some aspects described herein relate to a method of wireless communication performed by a transmitter node. The method may include receiving scheduling information associated with transmitting a waveform according to a set of parameters, wherein the set of parameters includes one or more parameters for a transition region for the waveform, where the transition region is a region of a frequency spectrum of the waveform in which a power spectral density is less than an average power spectral density of a core region of the frequency spectrum of the waveform. The method may include transmitting the waveform based at least in part on the scheduling information and according to the set of parameters.

Some aspects described herein relate to a transmitter node for wireless communication. The transmitter node may include one or more memories and one or more processors coupled to the one or more memories. The one or more processors may be configured to determine a set of parameters for a waveform to be transmitted by the transmitter node, where the waveform is to use an allocated bandwidth that is larger than a sweeping bandwidth of an FMCW chirp. The one or more processors may be configured to transmit the waveform according to the set of parameters.

Some aspects described herein relate to a network entity for wireless communication. The network entity may include one or more memories and one or more processors coupled to the one or more memories. The one or more processors may be configured to determine a set of parameters for a waveform to be transmitted by a transmitter node, where the waveform is to use an allocated bandwidth that is larger than a sweeping bandwidth of an FMCW chirp. The one or more processors may be configured to transmit information associated with the set of parameters for reception by the transmitter node.

Some aspects described herein relate to a network entity for wireless communication. The network entity may include one or more memories and one or more processors coupled to the one or more memories. The one or more processors may be configured to determine a set of parameters for a first waveform to be transmitted by a first transmitter node, the set of parameters including one or more parameters for a transition region for the first waveform, where the transition region is a region of a frequency spectrum of the first waveform in which a power spectral density is less than an average power spectral density of a core region of the frequency spectrum of the first waveform.

The one or more processors may be configured to transmit scheduling information for the first transmitter node to transmit the first waveform according to the set of parameters.

Some aspects described herein relate to a transmitter node for wireless communication. The transmitter node may include one or more memories and one or more processors coupled to the one or more memories. The one or more processors may be configured to receive scheduling information associated with transmitting a waveform according to a set of parameters, wherein the set of parameters includes one or more parameters for a transition region for the waveform, where the transition region is a region of a frequency spectrum of the waveform in which a power spectral density is less than an average power spectral density of a core region of the frequency spectrum of the waveform. The one or more processors may be configured to transmit the waveform based at least in part on the scheduling information and according to the set of parameters.

Some aspects described herein relate to a non-transitory computer-readable medium that stores a set of instructions for wireless communication by a transmitter node. The set of instructions, when executed by one or more processors of the transmitter node, may cause the transmitter node to determine a set of parameters for a waveform to be transmitted by the transmitter node, where the waveform is to use an allocated bandwidth that is larger than a sweeping bandwidth of an FMCW chirp. The set of instructions, when executed by one or more processors of the transmitter node, may cause the transmitter node to transmit the waveform according to the set of parameters.

Some aspects described herein relate to a non-transitory computer-readable medium that stores a set of instructions for wireless communication by a network entity. The set of instructions, when executed by one or more processors of the network entity, may cause the network entity to determine a set of parameters for a waveform to be transmitted by a transmitter node, where the waveform is to use an allocated bandwidth that is larger than a sweeping bandwidth of an FMCW chirp. The set of instructions, when executed by one or more processors of the network entity, may cause the network entity to transmit information associated with the set of parameters for reception by the transmitter node.

Some aspects described herein relate to a non-transitory computer-readable medium that stores a set of instructions for wireless communication by a network entity. The set of instructions, when executed by one or more processors of the network entity, may cause the network entity to determine a set of parameters for a first waveform to be transmitted by a first transmitter node, the set of parameters including one or more parameters for a transition region for the first waveform, where the transition region is a region of a frequency spectrum of the first waveform in which a power spectral density is less than an average power spectral density of a core region of the frequency spectrum of the first waveform. The set of instructions, when executed by one or more processors of the network entity, may cause the network entity to transmit scheduling information for the first transmitter node to transmit the first waveform according to the set of parameters.

Some aspects described herein relate to a non-transitory computer-readable medium that stores a set of instructions for wireless communication by a transmitter node. The set of instructions, when executed by one or more processors of the transmitter node, may cause the transmitter node to receive scheduling information associated with transmitting a waveform according to a set of parameters, wherein the set of parameters includes one or more parameters for a transition region for the waveform, where the transition region is a region of a frequency spectrum of the waveform in which a power spectral density is less than an average power spectral density of a core region of the frequency spectrum of the waveform. The set of instructions, when executed by one or more processors of the transmitter node, may cause the transmitter node to transmit the waveform based at least in part on the scheduling information and according to the set of parameters.

Some aspects described herein relate to an apparatus for wireless communication. The apparatus may include means for determining a set of parameters for a waveform to be transmitted by the transmitter node, where the waveform is to use an allocated bandwidth that is larger than a sweeping bandwidth of an FMCW chirp. The apparatus may include means for transmitting the waveform according to the set of parameters.

Some aspects described herein relate to an apparatus for wireless communication. The apparatus may include means for determining a set of parameters for a waveform to be transmitted by a transmitter node, where the waveform is to use an allocated bandwidth that is larger than a sweeping bandwidth of an FMCW chirp. The apparatus may include means for transmitting information associated with the set of parameters for reception by the transmitter node.

Some aspects described herein relate to an apparatus for wireless communication. The apparatus may include means for determining a set of parameters for a first waveform to be transmitted by a first transmitter node, the set of parameters including one or more parameters for a transition region for the first waveform, where the transition region is a region of a frequency spectrum of the first waveform in which a power spectral density is less than an average power spectral density of a core region of the frequency spectrum of the first waveform. The apparatus may include means for transmitting scheduling information for the first transmitter node to transmit the first waveform according to the set of parameters.

Some aspects described herein relate to an apparatus for wireless communication. The apparatus may include means for receiving scheduling information associated with transmitting a waveform according to a set of parameters, wherein the set of parameters includes one or more parameters for a transition region for the waveform, where the transition region is a region of a frequency spectrum of the waveform in which a power spectral density is less than an average power spectral density of a core region of the frequency spectrum of the waveform. The apparatus may include means for transmitting the waveform based at least in part on the scheduling information and according to the set of parameters.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, this specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIG. 8 is a diagram illustrating an example process performed, for example, at a network entity or an apparatus of a network entity, in accordance with the present disclosure.

FIG. 9 is a diagram illustrating an example process performed, for example, at a transmitter node or an apparatus of a transmitter node, in accordance with the present disclosure.

DETAILED DESCRIPTION

Figure 1:
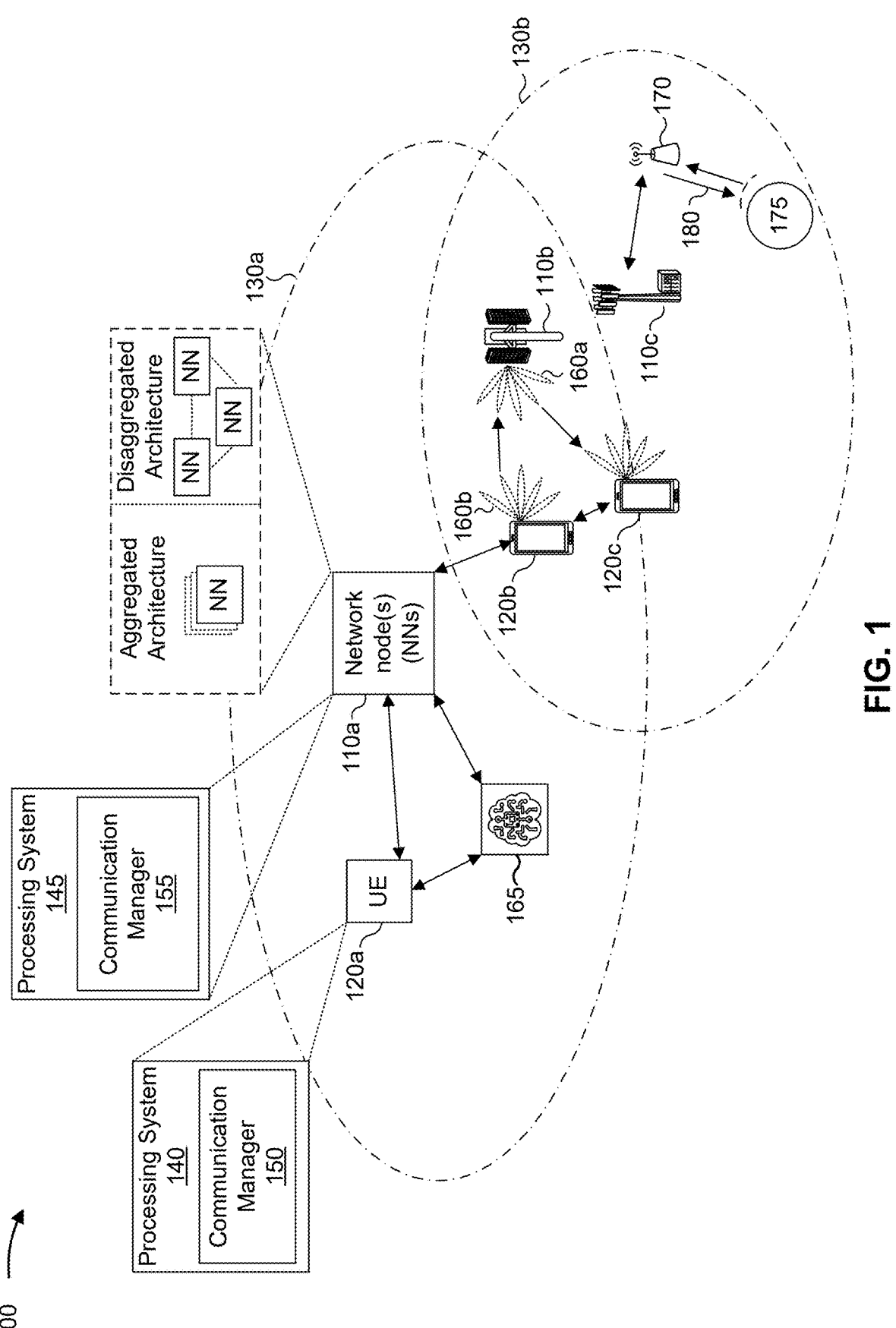
FIG. 1 is a diagram illustrating an example of a wireless communication network, in accordance with the present disclosure.

Various aspects of the present disclosure are described hereinafter with reference to the accompanying drawings. However, aspects of the present disclosure may be embodied in many different forms. The present disclosure is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A wireless communication system may support a functionality that uses radio frequency (RF) sensing, such as an integrated sensing and communications (ISAC) functionality. In one example of ISAC functionality, a transmitter node at a first device transmits a sensing (ISAC) signal. The ISAC signal is reflected by a target object and is received at one or more receiver nodes. A given receiver node may be co-located with the transmitter node in the first device or may be located in a second (different) device. Sensing enabled by reception of the reflected sensing signal at a receiver node that is co-located with the transmitter node in the first device is referred to as monostatic sensing. Conversely, sensing enabled by reception of the reflected sensing signal at a receiver node that is located in a second (different) device is referred to as bistatic sensing. With respect to ISAC, in the case of bistatic sensing, the reflected sensing signal can also be used for assisting wireless communications. For example, the reflected sensing signal can be used as a physical random access channel (PRACH) signal, a demodulation reference signal (DMRS), or a radar reference signal, among other examples.

Applications for ISAC include, for example, automotive, airborne vehicles, railways, indoor factories, human motion recognition (e.g., gesture recognition, health monitoring, or the like), or sensing-assisted communication (e.g., beam management), among other examples. A significant benefit of ISAC functionality is the reuse of a communication framework (e.g., hardware, frequency spectrum, signaling design, wireless communication specifications, or the like) with minimal modifications being needed to support sensing applications. Waveform design to support sensing is a challenge for ISAC. In some systems, an orthogonal frequency-division multiplexing (OFDM)-based waveform can be used in support of ISAC. More specifically, in some systems, an OFDM-based waveform can be used as a reference signal in support of ISAC for both monostatic and bistatic sensing.

In some systems, linear frequency modulation (LFM) chirps can be used in support of sensing. An LFM chirp is a frequency-modulated continuous-wave (FMCW) signal (i.e., a frequency-modulated continuous-time waveform) with a linear relation between frequency and time. Advantages of LFM chirps include: (1) perfect peak-to-average power ratio (PAPR), (2) good aperiodic autocorrelation properties, and (3) low-complexity of implementation. However, a disadvantage of LFM chirps is that an LFM cannot be directly expressed as an OFDM waveform.

Further, a Zadoff-Chu (ZC) sequence can be used in support of communication in an OFDM framework (e.g., in a PRACH signal, a sounding reference signal (SRS), a DMRS, or the like). Advantages of ZC sequences include: (1) good periodic correlation properties, and (2) constant amplitude zero periodic autocorrelation (CAZAC) properties (e.g., a ZC sequence preserves its CAZAC properties with cyclic shifts in frequency or time domain at discrete fast-Fourier transform (FFT) or inverse FFT (IFFT) points with an FFT/IFFT length of M with perfect synchronization). However, a disadvantage of ZC sequences is that they suffer from poor PAPR and have limited sensing performance.

With respect to a relationship between LFM chirps and ZC sequences, a ZC sequence can be viewed as an OFDM implementation of an LFM chirp. However, there are compromises made to preserve CAZAC properties at the cost of poor PAPR and limited sensing performance. A ZC sequence can be derived from an LFM chirp by using a sampling frequency ($f_s$) equal to a sweeping bandwidth of the LFM chirp (B). However, the LFM spectrum extends far beyond the sweeping bandwidth. Further, ZC suffers from poor PAPR due to aliasing effects, and ZC does not maintain good linearity between frequency over time, which leads to poor sensing performance (e.g., in comparison to LFM). Therefore, a chirp-based sequence design with improved PAPR and sensing performance is desirable.

Various aspects relate generally to an enhanced waveform. Some aspects more specifically relate to an enhanced waveform in support of ISAC in a wireless communication system. In some aspects, the enhanced waveform described herein uses OFDM implementations of continuous-time LFM chirps (e.g., enhanced aliased-ZC (EA-ZC) or enhanced truncated-ZC (ET-ZC). In some aspects, the enhanced waveform described herein is derived by using a sampling frequency $f_s$ that is greater than a sweeping bandwidth B (i.e., $f_s=\alpha B$, where $\alpha$ is an expansion factor with a value that is greater than 1). Additionally, or alternatively, the enhanced waveform described herein may be derived by cyclically band-limiting an LFM chirp and using a higher sampling frequency $f_s$ (i.e., $f_s=\alpha B$, where $\alpha$ is an expansion factor with a value that is greater than 1). Further, in some aspects, a frequency spectrum of the enhanced waveform described herein may comprise a transition region, which is a region of a frequency spectrum of the waveform in which a power spectral density is less than an average power spectral density of a core region of the frequency spectrum of the waveform (e.g., a region in which power spectral density is significantly less than in the remaining bandwidth).

Particular aspects of the subject matter described in this disclosure can be implemented to realize one or more of the following potential advantages. In some examples, the enhanced waveforms described herein can be used to enable improved PAPR and sensing performance (e.g., as compared to traditional ZC). For example, in some aspects, an enhanced waveform described herein can serve to reduce degradation due to aliasing (e.g., as compared to conventional ZC). As another example, in some aspects, an enhanced waveform described herein serves to increase a sampling rate such that aliasing is eliminated. In this way, a chirp-based sequence design with improved PAPR and sensing performance can be achieved, thereby improving performance in a system that supports an ISAC functionality.

As described above, wireless communication systems may be deployed to provide various services, which may involve carrying or supporting voice, text, other messaging, video, data, and/or other traffic. Some wireless communications systems may employ multiple-access radio access technologies (RATs). The multiple-access RATs may be capable of supporting communication with multiple wireless communication devices by sharing the available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

Multiple-access RATs are supported by technological advancements that have been adopted in various telecommunication standards, which define common protocols that enable wireless communication devices to communicate on a local, municipal, enterprise, national, regional, or global level. For example, 5G New Radio (NR) is part of a continuous mobile broadband evolution promulgated by the Third Generation Partnership Project (3GPP). 5G NR may support enhanced mobile broadband (eMBB) access, Internet of Things (IoT) networks or reduced capability (Red-Cap) device deployments, ultra-reliable low-latency communication (URLLC) applications, and/or massive machine-type communication (mMTC), among other examples.

To support these and other target verticals, a wireless communication system may be designed to implement a modularized functional infrastructure, a disaggregated and service-based network architecture, network function virtualization, network slicing, multi-access edge computing, millimeter wave (mmWave) technologies including massive multiple-input multiple-output (MIMO), beamforming, IoT device or RedCap device connectivity and management, industrial connectivity, licensed and unlicensed spectrum access, sidelink and other device-to-device direct communication (for example, cellular vehicle-to-everything (CV2X) communication), frequency spectrum expansion, overlapping spectrum use, small cell deployments, non-terrestrial network (NTN) deployments, device aggregation, advanced duplex communication (for example, sub-band full-duplex (SBFD)), multiple-subscriber implementations, high-precision positioning, radio frequency (RF) sensing, network energy savings (NES), low-power signaling and radios, and/or artificial intelligence or machine learning (AI/ML), among other examples.

The foregoing and other technological improvements may support use cases, such as wireless fronthauls, wireless midhauls, wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples.

As the demand for connectivity continues to increase, further improvements in NR may be implemented, and other RATs, such as 6G and beyond, may be introduced to enable new applications and facilitate new use cases. The methods, operations, apparatuses, and techniques described herein may enable one or more of the foregoing technologies or new technologies and/or support one or more of the foregoing use cases or new use cases.

FIG. 1 is a diagram illustrating an example of a wireless communication network 100, in accordance with the present disclosure. The wireless communication network 100 may be or may include elements of a 5G (or NR) network or a 6G network, among other examples. The wireless communication network 100 may include multiple network nodes 110. For example, in FIG. 1, the wireless communication network 100 includes a network node (NN) 110a, a network node 110b, and a network node 110c. The network nodes 110 may support communications with multiple UEs 120. For example, in FIG. 1, the network nodes 110 support communication with a UE 120a, a UE 120b, a UE 120c, and a sensing device 170. In some examples, a UE 120 may also communicate with other UEs 120 and a network node 110 may communicate with a core network and with other network nodes 110.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless communication networks 100 may be deployed in a given geographic area. Each wireless communication network 100 may support a particular RAT (which may also be referred to as an air interface) and may operate on one or more carrier frequencies in one or more frequency bands or ranges. In some examples, when multiple RATs are deployed in a given geographic area, each RAT in the geographic area may operate on different frequencies to avoid interference with other RATs. Additionally or alternatively, in some examples, the wireless communication network 100 may implement dynamic spectrum sharing (DSS), in which multiple RATs are implemented with dynamic bandwidth allocation (for example, based on user demand) in a single frequency band. In some examples, the wireless communication network 100 may support communication over unlicensed spectrum, where access to an unlicensed channel is subject to a channel access mechanism. For example, in a shared or unlicensed frequency band, a transmitting device may perform a channel access procedure, such as a listen-before-talk (LBT) procedure, to contend against other devices for channel access before transmitting on a shared or unlicensed channel.

Various operating bands have been defined as frequency range designations FR1 (410 MHz through 7.125 GHZ), FR2 (24.25 GHz through 52.6 GHZ), FR3 (7.125 GHz through 24.25 GHz), FR4a or FR4-1 (52.6 GHz through 71 GHZ), FR4 (52.6 GHZ through 114.25 GHZ), and FR5 (114.25 GHz through 300 GHz). Although a portion of FR1 is greater than 6 GHZ, FR1 is often referred to (interchangeably) as a "sub-6 GHz" band in some documents and articles. Similarly, FR2 is often referred to (interchangeably) as a "millimeter wave" band in some documents and articles, despite being different than the extremely high frequency (EHF) band (30 GHz, through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into the mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to mid-band frequencies or to frequencies that are within FR2, FR4, FR4-a or FR4-1, FR5, and/or the EHF band. Higher frequency bands may extend 5G NR operation, 6G operation, and/or other RATs beyond 52.6 GHZ.

A network node 110 and/or a UE 120 may include one or more devices, components, or systems that enable communication with other devices, components, or systems of the wireless communication network 100. For example, a UE 120 and a network node 110 may each include one or more chips, system-on-chips (SoCs), chipsets, packages, or devices that individually or collectively constitute or comprise a processing system, such as a processing system 140 of the UE 120 or a processing system 145 of the network node 110. A processing system (for example, the processing system 140 and/or the processing system 145) includes processor (or "processing") circuitry in the form of one or multiple processors, microprocessors, processing units (such as central processing units (CPUs), graphics processing units (GPUs), neural processing units (NPUs) (also referred to as neural network processors or deep learning processors (DLPs)), and/or digital signal processors (DSPs)), processing blocks, application-specific integrated circuits (ASICs), programmable logic devices (PLDs), or other discrete gate or transistor logic or circuitry (any one or more of which may be generally referred to herein individually as a "processor" or collectively as "the processor" or "the processor circuitry"). Such processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set. In some other examples, each of a group of processors may be configurable or configured to perform a same set of functions.

The processing system 140 and the processing system 145 may each include memory circuitry in the form of one or multiple memory devices, memory blocks, memory elements, or other discrete gate or transistor logic or circuitry, each of which may include or implement tangible storage media such as random-access memory (RAM) or read-only memory (ROM), or combinations thereof (any one or more of which may be generally referred to herein individually as a "memory" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code or instructions (such as software) that, when executed by one or more of the processors, may configure one or more of the processors to perform various functions or operations described herein. Additionally or alternatively, in some examples, one or more of the processors may be configured to perform various functions or operations described herein without requiring configuration by software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise.

The processing system 140 and the processing system 145 may each include or be coupled with one or more modems (such as a cellular (for example, a 5G or 6G compliant) modem). In some examples, one or more processors of the processing system 140 and/or the processing system 145 include or implement one or more of the modems. The processing system 140 and the processing system 145 may also include or be coupled with multiple radios (collectively "the radio"), multiple RF chains, or multiple transceivers, each of which may in turn be coupled with one or more of multiple antennas. In some examples, one or more processors of the processing system 140 and/or the processing system 145 include or implement one or more of the radios, RF chains, or transceivers. An RF chain may include one or more filters, mixers, oscillators, amplifiers, analog-to-digital converters (ADCs), and/or other devices that convert between an analog signal (such as for transmission or reception via an air interface) and a digital signal (such as for processing by the processing system 140 of the UE 120 or by the processing system 145 of the network node 110).

A network node 110 and a UE 120 may each include one or multiple antennas or antenna arrays. Typical network nodes 110 and UEs 120 may include multiple antennas, which may be organized or structured into one or more antenna panels, one or more antenna groups, one or more sets of antenna elements, or one or more antenna arrays, among other examples. As used herein, the term "antenna" can refer to one or more antennas, one or more antenna panels, one or more antenna groups, one or more sets of antenna elements, or one or more antenna arrays. The term "antenna panel" can refer to a group of antennas (such as antenna elements) arranged in an array or panel, which may facilitate beamforming by manipulating parameters associated with the group of antennas. The term "antenna module" may refer to circuitry including one or more antennas as well as one or more other components (such as filters, amplifiers, or processors) associated with integrating the antenna module into a wireless communication device such as the network node 110 and the UE 120.

A network node 110 may be, may include, or may also be referred to as an NR network node, a 5G network node, a 6G network node, a Node B, a gNB, an access point (AP), a transmission reception point (TRP), a network entity, a network element, a network equipment, and/or another type of device, component, or system included in a radio access network (RAN). In various deployments, a network node 110 may be implemented as a single physical node (for example, a single physical structure) or may be implemented as two or more physical nodes (for example, two or more distinct physical structures). For example, a network node 110 may be a device or system that implements a part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node having an aggregated architecture, meaning that the network node 110 may implement a full radio protocol stack that is physically and logically integrated within a single physical structure in the wireless communication network 100. For example, an aggregated network node 110 may consist of a single standalone base station or a single TRP that operates with a full radio protocol stack to enable or facilitate communication between a UE 120 and a core network of the wireless communication network 100.

Alternatively, and as also shown, a network node 110 may be a disaggregated network node (sometimes referred to as a disaggregated base station), having a disaggregated architecture, meaning that the network node 110 may operate with a radio protocol stack that is physically distributed and/or logically distributed among two or more nodes in the same geographic location or in different geographic locations. An example disaggregated network node architecture is described in more detail below with reference to FIG. 2. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating network functionality into multiple units or modules that can be individually deployed.

The network nodes 110 of the wireless communication network 100 may include one or more central units (CUs), one or more distributed units (DUs), and one or more radio units (RUS). A CU may host one or more higher layers, such as a radio resource control (RRC) layer, a packet data convergence protocol (PDCP) layer, and a service data adaptation protocol (SDAP) layer, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host a lower PHY layer that is configured to perform functions, such as a fast Fourier transform (FFT), an inverse FFT (IFFT), beamforming, and/or physical random access channel (PRACH) extraction and filtering, among other examples. An RU may perform RF processing functions or lower PHY layer functions, such as an FFT, an IFFT, beamforming, or PRACH extraction and filtering, among other examples, according to a functional split, such as a lower layer split (LLS). In such an architecture, each RU can be operated to handle over the air (OTA) communication with one or more UEs 120. In some examples, a single network node 110 may include a combination of one or more CUs, one or more DUs, and/or one or more RUs. In some examples, a CU, a DU, and/or an RU may be implemented as a virtual unit, such as a virtual central unit (VCU), a virtual distributed unit (VDU), or a virtual radio unit (VRU), among other examples, which may be implemented as a virtual network function, such as in a cloud deployment.

Some network nodes 110 (for example, a base station, an RU, or a TRP) may provide communication coverage for a particular geographic area. The term "cell" can refer to a coverage area of a network node 110 or to a network node 110 itself, depending on the context in which the term is used. A network node 110 may support one or more cells (for example, each cell may support communication within an angular (for example, 60 degree) range around the network node). In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with associated service subscriptions. A pico cell may cover a relatively small geographic area and may also allow unrestricted access by UEs 120 with associated service subscriptions. A femto cell may cover a relatively small geographic area (for example, a home) and may allow restricted access by UEs 120 having association with the femto cell (for example, UEs 120 in a closed subscriber group (CSG)). In some examples, a cell may not necessarily be stationary. For example, the geographic area of the cell may move according to the location of an associated mobile network node 110 (for example, a train, a satellite, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. Various different types of network nodes 110 may generally transmit at different power levels, serve different coverage areas (for example, a cell 130*a* and a cell 130*b*), and/or have different impacts on interference in the wireless communication network 100 than other types of network nodes 110.

The UEs 120 may be physically dispersed throughout the coverage area of the wireless communication network 100, and each UE 120 may be stationary or mobile. A UE 120 may be, may include, or may also be referred to as an access terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a netbook, a smartbook, an ultrabook, a medical device, a biometric device, a wearable device (for example, a smart watch, smart clothing, smart glasses, a smart wristband, smart jewelry, a gaming device, an entertainment device (for example, a music device, a video device, or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, eMBB, and/or precise positioning in the wireless communication network 100, among other examples. A third category of UEs 120 may have mid-tier complexity and/or capability (for example, a capability between that of the UEs 120 of the first category and that of the UEs 120 of the second capability). A UE 120 of the third category may be referred to as a reduced capability UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, or cameras that are associated with a limited bandwidth, power capacity, and/or transmission range, among other examples. RedCap UEs may support healthcare environments, building automation, electrical distribution, process automation, transport and logistics, or smart city deployments, among other examples.

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink and uplink resources may include time domain resources (for example, frames, sub-frames, slots, and symbols), frequency domain resources (for example, frequency bands, component carriers (CCs), subcarriers, resource blocks, and resource elements), and spatial domain resources (for example, particular transmit directions or beams).

Frequency domain resources may be subdivided into bandwidth parts (BWPs). A BWP may be a block of frequency domain resources (for example, a continuous set of resource blocks (RBs) within a full component carrier bandwidth) that may be configured at a UE-specific level. A UE 120 may be configured with both an uplink BWP and a downlink BWP (which may be the same or different). Each BWP may be associated with its own numerology (indicating a sub-carrier spacing (SCS) and cyclic prefix (CP)). A BWP may be dynamically configured or activated (for example, by a network node 110 transmitting a downlink control information (DCI) configuration to the one or more UEs 120) and/or reconfigured (for example, in real-time or near-real-time) according to changing network conditions in the wireless communication network 100 and/or specific requirements of one or more UEs 120. An active BWP defines the operating bandwidth of the UE 120 within the operating bandwidth of the serving cell. The use of BWPs enables more efficient use of the available frequency domain resources in the wireless communication network 100 because fewer frequency domain resources may be allocated to a BWP for a UE 120 (which may reduce the quantity of frequency domain resources that a UE 120 is required to monitor and reduce UE power consumption by enabling the UE to monitor fewer frequency domain resources), leaving more frequency domain resources to be spread across multiple UEs 120. Thus, BWPs may also assist in the implementation of lower-capability (for example, RedCap) UEs 120 by facilitating the configuration of smaller bandwidths for communication by such UEs 120 and/or by facilitating reduced UE power consumption.

As used herein, a downlink signal may be or include a reference signal, control information, or data. For example, downlink reference signals include a primary synchronization signal (PSS), a secondary SS (SSS), an SS block (SSB) (for example, that includes a PSS, an SSS, and a physical broadcast channel (PBCH)), a demodulation reference signal (DMRS), a phase tracking reference signal (PTRS), a tracking reference signal (TRS), and a channel state information (CSI) reference signal (CSI-RS), among other examples. A downlink signal carrying control information or data may be transmitted via a downlink channel. Downlink channels may include one or more control channels for transmitting control information and one or more data channels for transmitting data. Downlink reference signals may be transmitted in addition to, or multiplexed with, downlink control channel communications and/or downlink data channel communications. A downlink control channel may be specifically used to transmit DCI from a network node 110 to a UE 120. DCI generally contains the information the UE 120 needs to identify RBs in a subsequent subframe and how to decode them, including a modulation and coding scheme (MCS) or redundancy version parameters. Different DCI formats carry different information, such as scheduling information in the form of downlink or uplink grants, slot formal indicators (SFIs), preemption indicators (PIs), transmit power control (TPC) commands, hybrid automatic repeat request (HARQ) information, new data indicators (NDIs), among other examples. A downlink data channel may be used to transmit downlink data (for example, user data associated with a UE 120) from a network node 110 to a UE 120. Downlink control channels may include physical downlink control channels (PDCCHs), and downlink data channels may include physical downlink shared channels (PDSCHs). Control information or data communications may be transmitted on a PDCCH and PDSCH, respectively. For example, a PDCCH can carry DCI, while a PDSCH can carry a MAC control element (MAC-CE), an RRC message, or user data, among other examples. Each PDSCH may carry one or more transport blocks (TBs) of data.

As used herein, an uplink signal may include a reference signal, control information, or data. For example, uplink reference signals include a sounding reference signal (SRS), a PTRS, and a DMRS, among other examples. An uplink signal carrying control information or data may be transmitted via an uplink channel. An uplink channel may include one or more control channels for transmitting control information and one or more data channels for transmitting data. Uplink reference signals may be transmitted in addition to, or multiplexed with, uplink control channel communications and/or uplink data channel communications. An uplink control channel may be specifically used to transmit uplink control information (UCI) from a UE 120 to a network node 110. An uplink data channel may be used to transmit uplink data (for example, user data associated with a UE 120) from a UE 120 to a network node 110. Uplink control channels may include physical uplink control channels (PUCCHs), and uplink data channels may include physical uplink shared channels (PUSCHs). Control information or data communications may be transmitted on a PUCCH and PUSCH, respectively. For example, a PUCCH can carry UCI, while a PUSCH can carry a MAC-CE, an RRC message, or user data, among other examples. UCI can include a scheduling request (SR), HARQ feedback information (for example, a HARQ acknowledgement (ACK) indication or a HARQ negative acknowledgement (NACK) indication), uplink power control information (for example, an uplink TPC parameter), and/or CSI, among other examples. CSI can include a channel quality indicator (CQI) (indicative of downlink channel conditions to facilitate selection of transmission parameters, such as an MCS, by a network node 110), a precoding matrix indicator (PMI), a CSI-RS resource indicator (CRI) (for example, indicative of a beam used to transmit a CSI-RS), an SS/PBCH resource block indicator (SSBRI) (for example, indicative of a beam used to transmit an SSB), a layer indicator (LI), a rank indicator (RI), and/or measurement information (for example, a layer 1 (L1)-reference signal received power (RSRP) parameter, a received signal strength indicator (RSSI) parameter, a reference signal received quality (RSRQ) parameter, among other examples) which can be used for beam management, among other examples. Each PUSCH may carry one or more TBs of data.

The information (for example, data, control information, or reference signal information) transmitted by a network node 110 to a UE 120, or vice versa, may be represented as a sequence of binary bits that are mapped (for example, modulated) to an analog signal waveform (for example, a discrete Fourier transform (DFT)-spread-orthogonal frequency division multiplexing (OFDM) (DFT-s-OFDM) waveform or a CP-OFDM waveform) that is transmitted by the network node 110 or UE 120 over a wireless communication channel. In some examples, the network node 110 or the UE 120 (for example, using the processing system 145 or the processing system 140, respectively) may select an MCS (for example, an order of quadrature amplitude modulation (QAM), such as 64-QAM, 128-QAM, or 256-QAM, among other examples) for a downlink signal or an uplink signal. For example, the network node 110 may select an MCS for a downlink signal in accordance with UCI received from the UE 120. The network node 110 may transmit, to the UE 120, an indication of the selected MCS for the downlink signal, such as via DCI that schedules the downlink signal. As another example, the network node 110 may transmit, and the UE 120 may receive, an indication of an MCS to be applied for the one or more uplink signals, such as via DCI scheduling transmission of the one or more uplink signals.

The network node 110 or the UE 120 (such as by using the processing system 145 or the processing system 140, respectively, and/or one or more coupled modems) may perform signal processing on the information (such as filtering, amplification, modulation, digital-to-analog conversion, an IFFT operation, multiplexing, interleaving, mapping, and/or encoding, among other examples) to generate a processed signal in accordance with the selected MCS. In some examples, the network node 110 or the UE 120 (for example, using the processing system 145 or the processing system 140, respectively, and/or one or more coupled encoders or modems) may perform a channel coding operation or a forward error correction (FEC) operation to control errors in transmitted information. For example, the network node 110 or the UE 120 may perform an encoding operation to generate encoded information (such as by selectively introducing redundancy into the information, typically using an error correction code (ECC), such as a polar code or a low-density parity-check (LDPC) code). The network node 110 or the UE 120 (for example, using the processing system 145 and/or one or more modems) may further perform spatial processing (for example, precoding) on the encoded information to generate one or more processed or precoded signals for downlink or uplink transmission, respectively. In some examples, the network node 110 or the UE 120 may perform codebook-based precoding or non-codebook-based precoding. Codebook-based precoding may involve selecting a precoder (for example, a precoding matrix) using a codebook. For example, the network node 110 may provide precoding information indicating which precoder, defined by the codebook, is to be used by the UE 120. Non-codebook-based precoding may involve selecting or deriving a precoder based on, or otherwise associated with, one or more downlink or uplink signal measurements. The network node 110 or the UE 120 may transmit the processed downlink or uplink signals, respectively, via one or more antennas.

The network node 110 or the UE 120 may receive uplink signals or downlink signals, respectively, via one or more antennas. The network node 110 or the UE 120 (for example, using the processing system 145 or the processing system 140, respectively, and/or one or more coupled modems) may perform signal processing (for example, in accordance with the MCS) on the received uplink or downlink signals, respectively (such as filtering, amplification, demodulation, analog-to-digital conversion, an FFT operation, demultiplexing, deinterleaving, de-mapping, equalization, interference cancellation, and/or decoding, among other examples), to map the received signal(s) to a sequence of binary bits (for example, received information) that estimates the information transmitted by the network node 110 or the UE 120 via the downlink or uplink signals. The network node 110 or the UE 120 (for example, using the processing system 145 or the processing system 140, respectively, and/or a coupled decoder or one or more modems) may decode the received information (such as by using an ECC, a decoding operation, and/or an FEC operation) to detect errors and/or correct bit errors in the received information to generate decoded information. The decoded information may estimate the information transmitted via the downlink or uplink signals.

In some examples, a UE 120 and a network node 110 may perform MIMO communication. "MIMO" generally refers to transmitting or receiving multiple signals (such as multiple layers or multiple data streams) simultaneously over the same time and frequency resources. MIMO techniques generally exploit multipath propagation. A network node 110 and/or UE 120 may communicate using massive MIMO, multi-user MIMO, or single-user MIMO, which may involve rapid switching between beams or cells. For example, the amplitudes and/or phases of signals transmitted via antenna elements and/or sub-elements may be modulated and shifted relative to each other (such as by manipulating a phase shift, a phase offset, and/or an amplitude) to generate one or more beams, which is referred to as beamforming. For example, the network node 110b may generate one or more beams 160a, and the UE 120b may generate one or more beams 160b. The term "beam" may refer to a directional transmission of a wireless signal toward a receiving device or otherwise in a desired direction, a directional reception of a wireless signal from a transmitting device or otherwise in a desired direction, a direction associated with a directional transmission or directional reception, a set of directional resources associated with a signal transmission or signal reception (for example, an angle of arrival, a horizontal direction, and/or a vertical direction), a set of parameters that indicate one or more aspects of a directional signal, a direction associated with the signal, and/or a set of directional resources associated with the signal, among other examples.

MIMO may be implemented using various spatial processing or spatial multiplexing operations. In some examples, MIMO may include a massive MIMO technique which may be associated with an increased (for example, "massive") quantity of antennas at the network node 110 and/or at the UE 120, such as in a network implementing mmWave technology. Massive MIMO may improve communication reliability by enabling a network node 110 and/or a UE 120 to communicate the same data across different propagation (or spatial) paths. In some examples, MIMO may support simultaneous transmission to multiple receivers, referred to as multi-user MIMO (MU-MIMO). Some RATs may employ MIMO techniques, such as multi-TRP (mTRP) operation (including redundant transmission or reception on multiple TRPs), reciprocity in the time domain or the frequency domain, single-frequency-network (SFN) transmission, or non-coherent joint transmission (NC-JT).

To support MIMO techniques, the network node 110 and the UE 120 may perform one or more beam management operations, such as an initial beam acquisition operation, one or more beam refinement operations, and/or a beam recovery operation. For example, an initial beam acquisition operation may involve the network node 110 transmitting signals (for example, SSBs, CSI-RSs, or other signals) via respective beams (for example, of the beams 160a of the network node 110) and the UE 120 receiving and measuring the signal(s) via respective beams of multiple beams (for example, from the beams 160b of the UE 120) to identify a best beam (or beam pair) for communication between the UE 120 and the network node 110. For example, the UE 120 may transmit an indication (for example, in a message associated with a random access channel (RACH) operation) of a (best) identified beam of the network node 110 (for example, by indicating an SSBRI or other identifier associated with the beam). A beam refinement operation may involve a first device (for example, the UE 120 or the network node 110) transmitting signal(s) via a subset of beams (for example, identified based on, or otherwise associated with, measurements reported as part of one or more other beam management operations). A second device (for example, the network node 110 or the UE 120) may receive the signal(s) via a single beam (for example, to identify the best beam for communication from the subset of beams). The beam(s) may be identified via one or more spatial parameters, such as a transmission configuration indicator (TCI) state and/or a quasi co-location (QCL) parameter, among other examples. The network node 110 and the UE 120 may increase reliability and/or achieve efficiencies in throughput, signal strength, and/or other signal properties for massive MIMO operations by performing the beam management operations.

Some aspects and techniques as described herein may be implemented, at least in part, using an artificial intelligence (AI) program (for example, referred to herein as an "AI/ML model"), such as a program that includes a machine learning (ML) model and/or an artificial neural network (ANN) model. The AI/ML model may be deployed at one or more devices 165 (for example, a network node 110 and/or UEs 120). For example, the one or more devices 165 may include a UE 120 (for example, the processing system 140), a network node 110 (for example, the processing system 145), one or more servers, and/or one or more components of a cloud computing network, among other examples. In some examples, the AI/ML model (or an instance of the AI/ML model) may be deployed at multiple devices (for example, a first portion of the AI/ML model may be deployed at a UE 120 and a second portion of the AI/ML model may be deployed at a network node 110). In other examples, a first AI/ML model may be deployed at a UE 120 and a second AI/ML model may be deployed at a network node 110. The AI/ML model(s) may be configured to enhance various aspects of the wireless communication network 100. For example, the AI/ML model(s) may be trained to identify patterns or relationships in data corresponding to the wireless communication network 100, a device, and/or an air interface, among other examples. The AI/ML model(s) may support operational decisions relating to one or more aspects associated with wireless communications devices, networks, or services.

In some examples, the wireless communication network 100 may support an integrated sensing and communication (ISAC) service. ISAC service refers to a system that provides sensing capabilities (for example, RF sensing capabilities) using the same system and infrastructure (for example, the wireless communication network 100) that is used for communication. ISAC may sometimes be referred to as joint communication and radar (JCR). One or more sensing devices 170 in the wireless communication network 100 may perform RF sensing via the wireless communication network 100 (for example, using one or more RF signals). A sensing device 170 (sometimes referred to as a sensing unit) may be or may include a UE 120, a network node 110, a TRP, an RU, an IAB node, a RAN node, and/or another wireless communication device capable of performing RF sensing. RF sensing is a technology that enables wireless communication devices (for example, the sensing device 170 to acquire information about characteristics of the environment and/or one or more objects 175 within the environment. RF sensing uses RF signals 180 to determine the distance (range), angle, and/or instantaneous linear velocity, among other examples, of the one or more objects 175 RF sensing may provide a range of functionality for wireless communication devices, such as object detection, object recognition (for example, vehicle, human, or animal), object tracking, environment monitoring, motion monitoring, high accuracy localization, health monitoring, immersive XR application, home monitoring, weather monitoring, automotive operations (for example, maneuvering, navigation, and/or parking), pedestrian and/or obstacle monitoring for roadways and/or railways, unmanned ariel vehicle (UAV) operations (for example, UAV intrusion detection, UAV tracking, and/or collision avoidance), industrial operations (for example, automated guided vehicles (AGV), automated robots, and/or pedestrian monitoring), tracking, and/ or activity recognition, among other examples.

RF sensing may include communication-assisted sensing and/or sensing-assisted communication. Communication-assisted sensing may refer to a wireless communication device, such as a UE 120 or a network node 110, performing RF sensing using one or more hardware components and/or radio resources that are associated with communication. For example, the wireless communication device may obtain information indicative of characteristics of the environment and/or objects within the environment using RF signals 180 (for example, NR RF signals, 6G wireless signals, or other RF signals associated with wireless communication). Sensing-assisted communication may refer to a wireless communication device using sensing results to perform one or more communication operations. For example, sensing results may improve communication performance, such as by enabling more accurate beamforming, faster beam failure recovery, and/or reduced overhead for CSI tracking, among other examples.

In some examples, a sensing unit may obtain sensing data via RF signals 180 (in such examples the sensing data may be referred to as 3GPP sensing data, 5G wireless sensing data, 6G wireless sensing data, or wireless sensing data). Additionally or alternatively, the sensing device 170 may obtain sensing data via one or more sensors, such as a camera, a video recorder, a light detection and ranging (LiDAR) sensor, a radar, and/or a sonar sensor, among other examples. For example, the sensing device 170 may obtain sensing data via Wi-Fi sensing, radar sensing, and/or another type of sensing. Sensing data obtained via a sensor (sometimes referred to as non-3GPP sensing data) may be used by the sensing device 170 (or another device) to determine characteristics of object(s) 175 and/or characteristics of the environment. The non-3GPP sensing data may be used to achieve improved sensing results for wireless sensing performed by the sensing device 170.

In some aspects, a transmitter node (e.g., a UE 120, a sensing device 170, a network node 110, or the like) may include a communication manager (e.g., a communication manager 150 or a communication manager 155). As described in more detail elsewhere herein, the communication manager 150/155 may determine a set of parameters for a waveform to be transmitted by the transmitter node, wherein the waveform is to use an allocated bandwidth that is larger than a sweeping bandwidth of a frequency modulated continuous wave (FMCW) chirp; and transmit the waveform according to the set of parameters. Additionally, or alternatively, as described in more detail elsewhere herein, the communication manager 150/155 may receive scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform; and transmit the waveform based at least in part on the scheduling information and according to the set of parameters. Additionally, or alternatively, the communication manager 150/155 may perform one or more other operations described herein.

In some aspects, a network entity (e.g., a network node 110, a UE 120, a sensing device 170, or the like) may include a communication manager (e.g., a communication manager 155 or a communication manager 150). As described in more detail elsewhere herein, the communication manager 155/150 may determine a set of parameters for a waveform to be transmitted by a transmitter node, wherein the waveform is to use an allocated bandwidth that is larger than a sweeping bandwidth of an FMCW chirp; and transmit information associated with the set of parameters for reception by the transmitter node. Additionally, or alternatively, as described in more detail elsewhere herein, the communication manager 155/150 may determine a set of parameters for a first waveform to be transmitted by a first transmitter node, the set of parameters including one or more parameters for a transition region for the first waveform, wherein the transition region is a region of a frequency spectrum of the first waveform in which a power spectral density is less than an average power spectral density of a core region of the frequency spectrum of the first waveform; and transmit scheduling information for the first transmitter node to transmit the first waveform according to the set of parameters. Additionally, or alternatively, the communication manager 155/150 may perform one or more other operations described herein.

Figure 2:
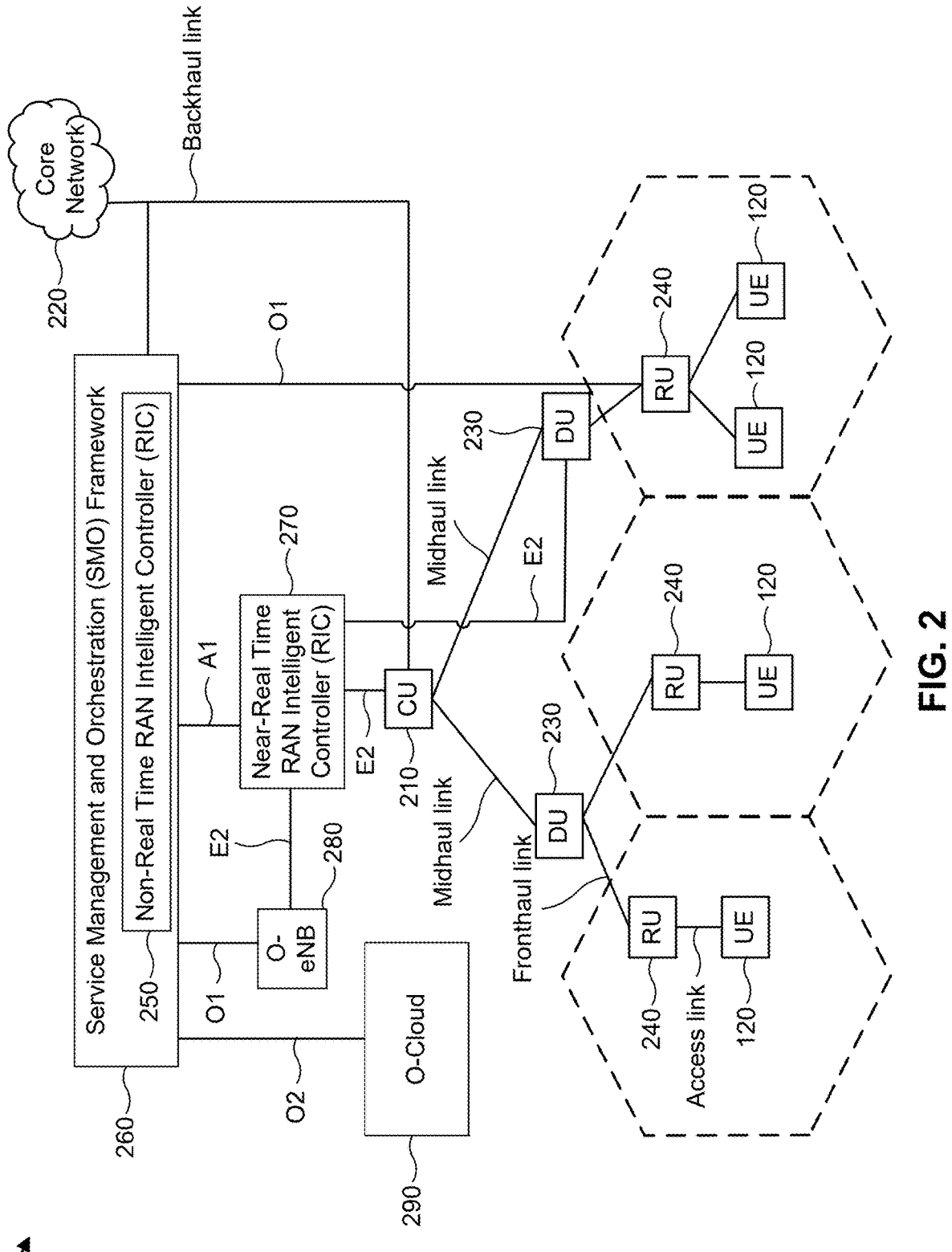
FIG. 2 is a diagram illustrating an example disaggregated network node architecture, in accordance with the present disclosure.

FIG. 2 is a diagram illustrating an example disaggregated network node architecture 200, in accordance with the present disclosure. One or more components of the example disaggregated network node architecture 200 may be, may include, or may be included in one or more network nodes (such one or more network nodes 110). The disaggregated network node architecture 200 may include a CU 210 that can communicate directly with a core network 220 via a backhaul link, or that can communicate indirectly with the core network 220 via one or more disaggregated control units, such as a non-real-time (Non-RT) RAN intelligent controller (RIC) 250 associated with a Service Management and Orchestration (SMO) Framework 260 and/or a near-real-time (Near-RT) RIC 270 (for example, via an E2 link). The CU 210 may communicate with one or more DUs 230 via respective midhaul links, such as via F1 interfaces. Each of the DUs 230 may communicate with one or more RUs 240 via respective fronthaul links. Each of the RUs 240 may communicate with one or more UEs 120 via respective RF access links. In some deployments, a UE 120 may be simultaneously served by multiple RUs 240.

Each of the components of the disaggregated network node architecture 200, including the CUs 210, the DUs 230, the RUs 240, the Near-RT RICs 270, the Non-RT RICs 250, and the SMO Framework 260, may include one or more interfaces or may be coupled with one or more interfaces for receiving or transmitting signals, such as data or information, via a wired or wireless transmission medium.

In some aspects, the CU 210 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 210 may be deployed to communicate with one or more DUs 230, as necessary, for network control and signaling. Each DU 230 may correspond to a logical unit that includes one or more base station functions to control the operation of one or more RUs 240. For example, a DU 230 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 230, or for communicating signals with the control functions hosted by the CU 210. Each RU 240 may implement lower layer functionality. In some aspects, real-time and non-real-time aspects of control and user plane communication with the RU(s) 240 may be controlled by the corresponding DU 230.

The SMO Framework 260 may support RAN deployment and provisioning of non-virtualized and virtualized network elements. For non-virtualized network elements, the SMO Framework 260 may support the deployment of dedicated physical resources for RAN coverage requirements, which may be managed via an operations and maintenance interface, such as an O1 interface. For virtualized network elements, the SMO Framework 260 may interact with a cloud computing platform (such as an open cloud (O-Cloud) platform 290) to perform network element life cycle management (such as to instantiate virtualized network elements) via a cloud computing platform interface, such as an O2 interface. A virtualized network element may include, but is not limited to, a CU 210, a DU 230, an RU 240, a non-RT RIC 250, and/or a Near-RT RIC 270. In some aspects, the SMO Framework 260 may communicate with a hardware aspect of a 4G RAN, a 5G NR RAN, and/or a 6G RAN, such as an open eNB (O-eNB) 280, via an O1 interface. Additionally or alternatively, the SMO Framework 260 may communicate directly with each of one or more RUs 240 via a respective O1 interface. In some deployments, this configuration can enable each DU 230 and the CU 210 to be implemented in a cloud-based RAN architecture, such as a vRAN architecture.

The Non-RT RIC 250 may include or may implement a logical function that enables non-real-time control and optimization of RAN elements and resources, AI/ML workflows including model training and updates, and/or policy-based guidance of applications and/or features in the Near-RT RIC 270. The Non-RT RIC 250 may be coupled to or may communicate with (such as via an A1 interface) the Near-RT RIC 270. The Near-RT RIC 270 may include or may implement a logical function that enables near-real-time control and optimization of RAN elements and resources via data collection and actions via an interface (such as via an E2 interface) connecting one or more CUs 210, one or more DUs 230, and/or an O-eNB 280 with the Near-RT RIC 270.

In some aspects, to generate AI/ML models to be deployed in the Near-RT RIC 270, the Non-RT RIC 250 may receive parameters or external enrichment information from external servers. Such information may be utilized by the Near-RT RIC 270 and may be received at the SMO Framework 260 or the Non-RT RIC 250 from non-network data sources or from network functions. In some examples, the Non-RT RIC 250 or the Near-RT RIC 270 may tune RAN behavior or performance. For example, the Non-RT RIC 250 may monitor long-term trends and patterns for performance and may employ AI/ML models to perform corrective actions via the SMO Framework 260 (such as reconfiguration via an O1 interface) or via creation of RAN management policies (such as A1 interface policies).

The network node 110, the processing system 145 of the network node 110, the UE 120, the processing system 140 of the UE 120, the CU 210, the DU 230, the RU 240, or any other component(s) of FIG. 1 and/or FIG. 2 may implement one or more techniques or perform one or more operations associated with an enhanced ISAC waveform, as described in more detail elsewhere herein. For example, the processing system 145 of the network node 110, the processing system 140 of the UE 120, the sensing device 170, the CU 210, the DU 230, or the RU 240 may perform or direct operations of, for example, process 600 of FIG. 6, process 700 of FIG. 7, process 800 of FIG. 8, process 900 of FIG. 9, or other processes as described herein (alone or in conjunction with one or more other processors). In some aspects, a transmitter node described herein is the network node 110, is included in the network node 110, or includes one or more components of the network node 110 shown in FIG. 1. In some aspects, a transmitter node described herein is the UE 120, is included in the UE 120, or includes one or more components of the UE 120 shown in FIG. 1. In some aspects, a transmitter node described herein is the sensing device 170, is included in the sensing device 170, or includes one or more components of the sensing device 170 shown in FIG. 1. In some aspects, a network entity described herein is the network node 110, is included in the network node 110, or includes one or more components of the network node 110 shown in FIG. 1. In some aspects, a network entity described herein is the UE 120, is included in the UE 120, or includes one or more components of the UE 120 shown in FIG. 1. In some aspects, a network entity described herein is the sensing device 170, is included in the sensing device 170, or includes one or more components of the sensing device 170 shown in FIG. 1. Memory of the network node 110 may store data and program code (or instructions) for the network node 110, the CU 210, the DU 230, or the RU 240. In some examples, the memory of the network node 110 may store data relating to a UE 120, such as RRC state information or a UE context. Memory of a UE 120 may store data and program code (or instructions) for the UE 120, such as context information. In some examples, the memory of the UE 120 or the memory of the network node 110 may include a non-transitory computer-readable medium storing a set of instructions for wireless communication. For example, the set of instructions, when executed by one or more processors (for example, of the processing system 145 or the processing system 140) of the network node 110, the UE 120, the sensing device 170, the CU 210, the DU 230, or the RU 240, may cause the one or more processors to perform process 600 of FIG. 6, process 700 of FIG. 7, process 800 of FIG. 8, process 900 of FIG. 9, or other processes as described herein. In some examples, executing instructions may include running the instructions, converting the instructions, compiling the instructions, and/or interpreting the instructions, among other examples.

In some aspects, a transmitter node (e.g., a transmitter node 410, a transmitter node 510 a UE 120, a sensing device 170, a network node 110, or the like) includes means for determining a set of parameters for a waveform to be transmitted by the transmitter node, wherein the waveform is to use an allocated bandwidth that is larger than a sweeping bandwidth of an FMCW chirp; and/or means for transmitting the waveform according to the set of parameters. In some aspects, the transmitter node includes means for receiving scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform; and/or means for transmitting the waveform based at least in part on the scheduling information and according to the set of parameters. In some aspects, the means for the transmitter node to perform operations described herein may include, for example, one or more of communication manager 155, processing system 145, a radio, one or more RF chains, one or more transceivers, one or more antennas, one or more modems, a reception component (for example, reception component 1002 depicted and described in connection with FIG. 10), and/or a transmission component (for example, transmission component 1004 depicted and described in connection with FIG. 10), among other examples. Additionally, or alternatively, the means for the transmitter node to perform operations described herein may include, for example, one or more of communication manager 150, processing system 140, a radio, one or more RF chains, one or more transceivers, one or more antennas, one or more modems, a reception component, and/or a transmission component, among other examples.

In some aspects, a network entity (e.g., a network entity 405, a network entity 505, a network node 110, a UE 120, a sensing device 170, or the like) includes means for determining a set of parameters for a waveform to be transmitted by a transmitter node, wherein the waveform is to use an allocated bandwidth that is larger than a sweeping bandwidth of an FMCW chirp; and/or means for transmitting information associated with the set of parameters for reception by the transmitter node. In some aspects, the network entity includes means for determining a set of parameters for a first waveform to be transmitted by a first transmitter node, the set of parameters including one or more parameters for a transition region for the first waveform, wherein the transition region is a region of a frequency spectrum of the first waveform in which a power spectral density is less than an average power spectral density of a core region of the frequency spectrum of the first waveform; and/or means for transmitting scheduling information for the first transmitter node to transmit the first waveform according to the set of parameters. In some aspects, the means for the network entity to perform operations described herein may include, for example, one or more of communication manager 155, processing system 145, a radio, one or more RF chains, one or more transceivers, one or more antennas, one or more modems, a reception component (for example, reception component 1102 depicted and described in connection with FIG. 11), and/or a transmission component (for example, transmission component 1104 depicted and described in connection with FIG. 11), among other examples. Additionally, or alternatively, the means for the network entity to perform operations described herein may include, for example, one or more of communication manager 150, processing system 140, a radio, one or more RF chains, one or more transceivers, one or more antennas, one or more modems, a reception component, and/or a transmission component, among other examples.

Figure 3:
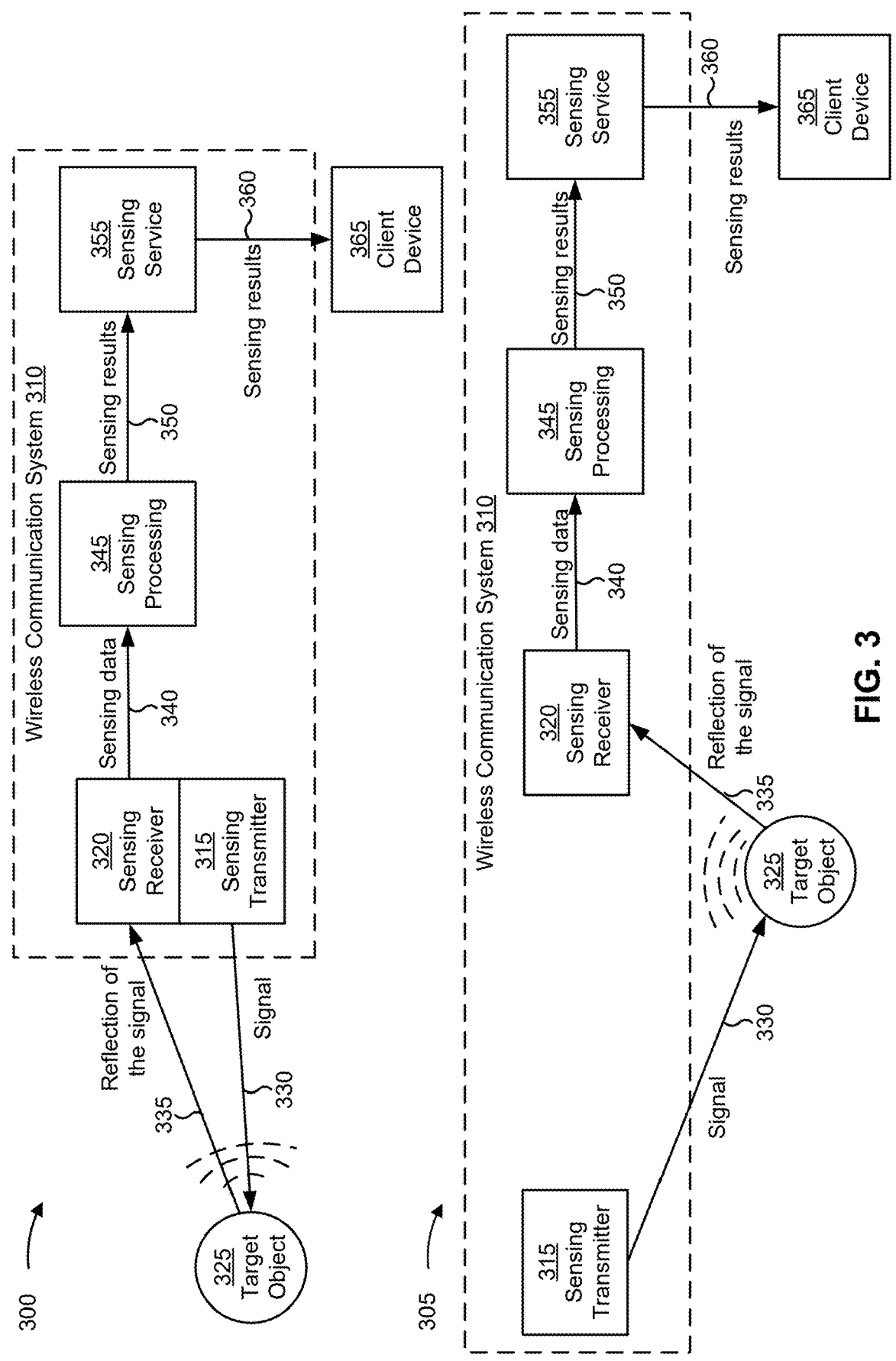
FIG. 3 is a diagram illustrating examples of radio frequency (RF) sensing in accordance with the present disclosure.

FIG. 3 is a diagram illustrating examples of RF sensing in accordance with the present disclosure. Wireless communication signals (for example, RF signals configured to carry OFDM symbols) transmitted, for example, between a UE 120 and a network node 110 can be reused for RF sensing. Using wireless communication signals for RF sensing can be considered consumer-level radar with advanced detection capabilities that enable, among other things, touchless/device-free interaction with a device/system. "RF sensing" may be a radar operation performed by a wireless communication device, such as a UE, a network entity, or another device (such as a wireless local area network (WLAN) access point), using wireless communication signals.

RF sensing may also be referred to as environment sensing, radar sensing, WLAN sensing. Wi-Fi sensing, and/or wireless sensing, among other examples. The wireless communication signals used to perform RF sensing may be cellular communication signals (for example, LTE signals, NR signals, and/or 6G signals) or WLAN signals (for example, Wi-Fi signals), among other examples. As an example, the wireless communication signals may be an OFDM waveform as utilized in the wireless communication network 100. High-frequency communication signals, such as millimeter wave signals, may be beneficial to use as RF sensing signals because the higher frequency provides a more accurate range (for example, distance) detection and/or motion detection. As another example, WLAN signals (for example, WLAN or Wi-Fi signals that would otherwise be used for wireless communication) may be used to perform RF sensing (for example, to conserve power relative to using a higher frequency range signal). In such examples, the RF sensing may be referred to as WLAN sensing or Wi-Fi sensing. RF sensing may be performed using various frequency bands or frequency ranges, such as the millimeter wave band or the sub-6 GHz band, among other examples. In some examples, different frequencies may be used sequentially (for example, first using a sub-6 GHz frequency and second using a millimeter wave frequency) by a wireless communication device performing the RF sensing to vary a resolution (for example, from coarse to fine), vary a detection range (for example, from large to narrow), and/or vary power consumption (for example, from low to high), among other examples.

As shown in FIG. 3, one or more sensing units (SUs) may detect and/or monitor a target object by transmitting and/or measuring wireless communication signals. FIG. 3 depicts an example 300 of monostatic sensing. For example, the one or more SUs may be included in a wireless communication system 310, such as the wireless communication network 100. A sensing transmitter 315 and a sensing receiver 320 may communicate RF signals (for example, wireless communication signals) to perform RF sensing. In some examples, the sensing transmitter 315 and the sensing receiver 320 may be co-located, such as in a single SU (for example, as depicted in the example 300 of monostatic sensing). Examples where the sensing transmitter 315 and the sensing receiver 320 are co-located may be referred to as "monostatic sensing." FIG. 3 also depicts an example 305 of bistatic sensing. For example, the sensing transmitter 315 and the sensing receiver 320 may not be co-located (for example, as depicted in the example 305 of bistatic sensing). For example, the sensing transmitter 315 and the sensing receiver 320 may be included in separate devices, such as in separate SUs. Examples where the sensing transmitter 315 and the sensing receiver 320 are not co-located (for example, are included in different entities) may be referred to as "bistatic sensing." In some examples, RF sensing may be associated with obtaining sensor data that is indicative of a characteristic of a target object 325. In other examples, an RF sensing operation may include multiple sensing transmitters 315 and/or multiple sensing receivers 320 (for example, referred to as "multistatic sensing").

As shown in FIG. 3, the sensing transmitter 315 may transmit one or more signals 330. The one or more signals 330 may be RF signals, wireless communication signals, OFDM signals, and/or sensing reference signals, among other examples. The one or more signals may reflect off of the target object 325, resulting in a reflection 335 of the signal 330. The reflection 335 may be a reflection of a signal 330, a refraction of the signal 330, a diffraction of the signal 330, and/or a deflected version of the signal 330, among other examples. The sensing receiver 320 may receive and/or detect the reflection 335. The sensing receiver 320 may perform one or more measurements of the reflection 335 to obtain sensing data 340. The sensing data 340 may include information that is indicative of one or more characteristics of the target object 325. For example, the sensing data 340 may include a signal strength (for example, an RSRP), a received raw signal sample, a channel delay profile, one or more Doppler measurements (for example, Doppler per channel tap), CSI, CQI, time delay measurements, and/or an angle of arrival (AoA) (for example, AoA per channel tap), among other examples.

As shown in FIG. 3, sensing processing 345 may be performed using the sensing data 340 to obtain sensing results 350. In some examples, an SU (for example, that includes the sensing receiver 320) may perform the sensing processing 345. In such examples, the SU may transmit, to a network node 110, the sensing results 350. In other examples, another device, such as a network node 110, may perform the sensing processing 345. In such examples, an SU (for example, that includes the sensing receiver 320) may transmit, and the network node 110 may receive, the sensing data 340. The sensing results 350 may include information for one or more characteristics of the target object 325. For example, the sensing results 350 may include positioning information, velocity information, a sensing resolution, object detection information, and/or other information that is determined using the sending data 340. The sensing results 350 may be provided to a sensing service 355 of the wireless communication system 310. The sensing service 355 may include one or more core network nodes or entities, such as one or more network nodes 110, UEs 120, and/or SUs, among other examples. For example, the sensing service 355 may include a sensing management function (SnMF) entity, as described in more detail elsewhere herein. The sensing service 355 may provide, to a client device 365, sensing results 360. The sensing results 360 may be the sensing results 350 or may be based on the sensing results 350. The client device 365 may be a server device or an application executing on a device. For example, the client device 365 may provide, to the sensing service 355, a sensing request. The sensing service 355 may configure, manage, and/or otherwise maintain a sensing operation (for example, in a similar manner as described herein) for fulfilling the sensing request.

Potential use cases of RF sensing include health monitoring (such as heartbeat detection, and/or respiration rate monitoring, among other examples), gesture recognition (such as human activity recognition, keystroke detection, and/or sign language recognition, among other examples), contextual information acquisition (such as location detection/tracking, direction finding, and/or range estimation, among other examples), and/or automotive radar (such as smart cruise control and/or collision avoidance), among other examples. Similar to conventional radar (for example, frequency modulation continuous waveform (FMCW) radar), a signal 330 can be used to estimate the range (for example, distance), velocity (for example, Doppler spread), and/or angle (for example, AoA) of the target object 325. Unlike conventional radar, RF sensing may use a PHY layer for both RF sensing measurements and wireless communication. Signals 330 may be transmitted in a beam (for example, using beamforming) and may reflect off nearby objects within the beam. A portion of the transmitted RF signals is reflected back toward a sensing receiver 320, which may be the reflection 335 (for example, via the reflections of the transmitted signals).

In some examples, an OFDM waveform can be used for both wireless communication (for example, over a wireless network) and RF sensing. To use an OFDM waveform as a signal for RF sensing, specific reference signals, which may be referred to herein as sensing reference signals, may be needed. The RF sensing performance (for example, resolution and maximum values of range, velocity, and/or angle) may depend on the sensing reference signal design. For example, for a gesture recognition use case, coarse range/velocity estimation may be sufficient for the RF sensing. That is, it may be sufficient for a wireless communication device to be able to detect a pattern of movement relative to the current position of the target object 325 (for example, a user's hand or head). In such examples, a low density (for example, sparse) sensing reference signal with a short wavelength and narrow bandwidth may be sufficient to provide the necessary range and velocity resolution. For a vibration detection use case, such as for respiration monitoring, accurate Doppler estimation may be important, whereas accurate range estimation may not be as important. In such examples, a high-density sensing reference signal with a long duration in the time domain may be beneficial. For a location detection use case, such as for object detection, accurate range estimation may be important, whereas accurate Doppler estimation may not be as important. In such examples, a high-density wideband sensing reference signal in the frequency domain may be beneficial. Therefore, a network entity may configure one or more sensing reference signals depending on a use case of the RF sensing to improve the RF sensing performance. In some examples, a sensing reference signal may be a sounding reference signal (SRS), a wireless communication reference signal, or a WLAN signal, among other examples.

In some aspects, the techniques and apparatuses described herein can be used in association with performance of RF sensing as described with respect to FIG. 3.

As indicated above, FIG. 3 is provided as an example. Other examples may differ from what is described with regard to FIG. 3.

Figure 4:
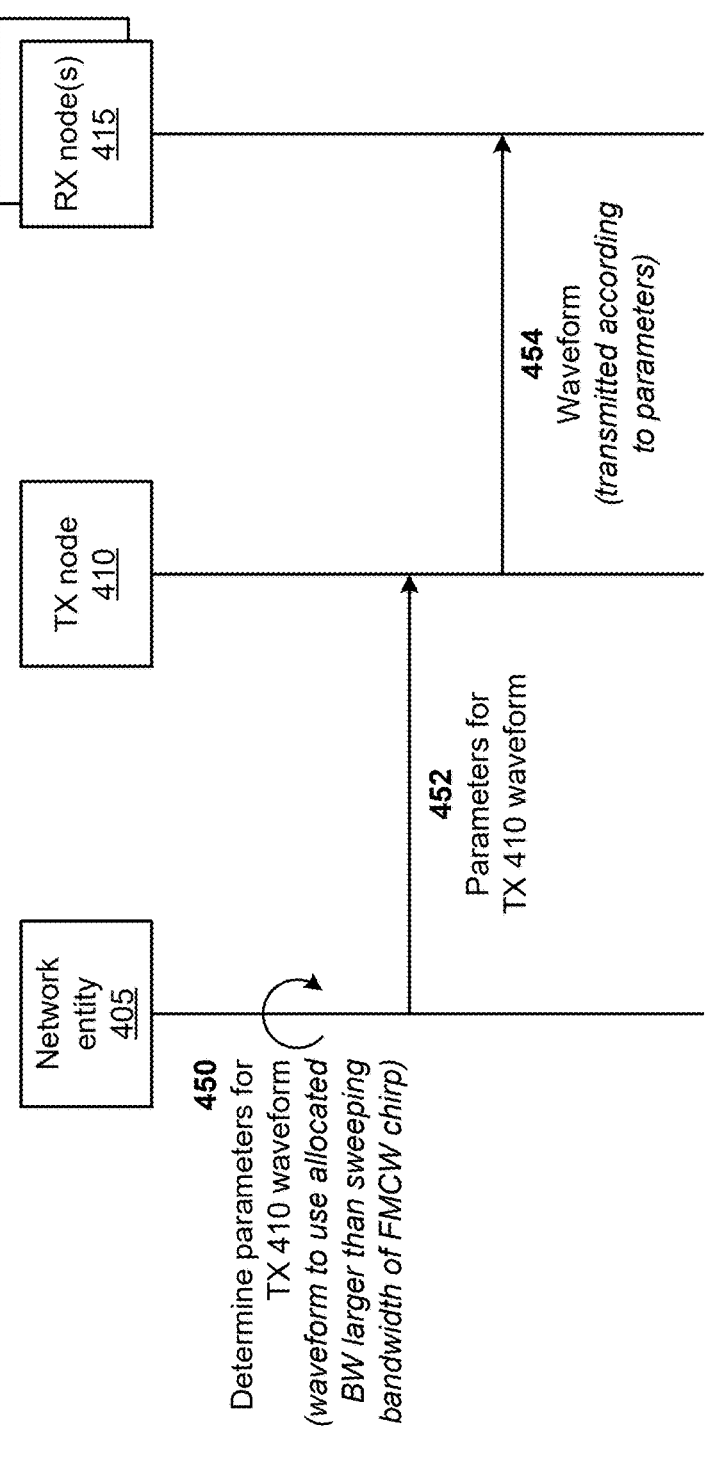
FIG. 4 is a diagram illustrating an example associated with an enhanced waveform that is to use an allocated bandwidth that is larger than a sweeping bandwidth of a frequency-modulated continuous-wave (FMCW) chirp, in accordance with present disclosure.

FIG. 4 is a diagram illustrating an example 400 associated with an enhanced waveform that is to use an allocated bandwidth that is larger than a sweeping bandwidth of an FMCW chirp, in accordance with present disclosure. As shown in FIG. 4, example 400 includes communication between a network entity 405, a transmitter (TX) node 410, and one or more receiver (RX) nodes 415. In some aspects, the network entity 405, the transmitter node 410, and the one or more receiver nodes 415 may be included in a wireless network, such as wireless network 100. In some aspects, the network entity 405 may correspond to a network node 110, a UE 120, or a sensing device 170 described above with respect to FIG. 1. In some aspects, the network entity 405 may include, for example, a base station, an SnMF, a road-side assistance unit (RSU), or a positioning reference unit (PRU). In some aspects, the transmitter node 410 may correspond to a UE 120, a sensing device 170, or a network node 110 described above with respect to FIG. 1. In some aspects, the transmitter node 410 includes a UE, a base station, an RSU, or PRU. In some aspects, a receiver node 415 may correspond to a UE 120, a sensing device 170, or a network node 110 as described above with respect to FIG. 1.

As shown at reference 450, the network entity 405 may determine a set of parameters for a waveform to be transmitted by the transmitter node 410. In some aspects, the waveform is to use an allocated bandwidth that is larger than a sweeping bandwidth (B) of an FMCW chirp. That is, the waveform may be configured to use an allocated bandwidth that exceeds a sweeping bandwidth B of an FMCW chirp (e.g., an LFM chirp). Notably, the allocated bandwidth exceeding the sweeping bandwidth B of the FMCW chirp enables improved PAPR and increased linearity in FMCW generation (e.g., as compared to a conventional ZC sequence).

In some aspects, the waveform may be a sensing waveform (e.g., a waveform to be used for sensing). In some aspects, the waveform may be an OFDM-based waveform. Thus, in some aspects, the waveform is an OFDM-based sensing waveform. In some aspects, the waveform may be based at least in part on an EA-ZC sequence. Alternatively, the waveform may in some aspects be based at least in part on an ET-ZC sequence. Further, in some aspects, the FMCW chirp may be an LFM chirp.

The set of parameters includes a set of parameters based at least in part on which the transmitter node 410 is to derive, generate, determine, or transmit the waveform.

In some aspects, the set of parameters includes one or more parameters associated with determining the sweeping bandwidth B of the FMCW chirp associated with the waveform. For example, in some aspects, the one or more parameters may include a parameter indicating an integer number of resource blocks (RBs) ($\beta$) and a parameter indicating a subcarrier spacing ($\Delta\_SCS$). Thus, in some aspects, the sweeping bandwidth B can be defined based at least in part on the integer number of RBs $\beta$ and the subcarrier spacing $\Delta\_SCS$ (e.g., $B=\beta\Delta\_SCS*12$). As another example, the one or more parameters include a parameter indicating a ZC equivalent integer number of resource blocks ($\beta\_ZC$) and a parameter indicating an expansion factor (a), where a is a value greater than or equal to 1 (e.g., $\beta=[\alpha\beta]\_ZC$). Thus, in some aspects, the sweeping bandwidth B can be defined based at least in part on the ZC equivalent integer number of RBs $\beta\_ZC$ and the expansion factor $\alpha$.

In some aspects, the set of parameters includes one or more parameters associated with determining a time duration (T) of the FMCW chirp associated with the waveform. For example, in some aspects, the one or more parameters may include a parameter indicating a number (e.g., an integer number or a fractional number) of symbol durations ($\delta_t$). Thus, in some aspects, the time duration T of the FMCW chirp may be defined as an integer or fractional number of symbol durations using the parameter $\delta_t$ (e.g., $T=T_O\delta_t$, where $\delta_t\leq1$ is a fractional number and $T_O$ is a symbol duration). As another example, in some aspects, the one or more parameters include a parameter indicating a sequence length ($M_t$). Thus, in some aspects, the time duration T of the FMCW chirp may be defined as an integer or fractional number of sequence lengths using the parameter $M_t$ (e.g., $T=M_tT_s$, where $T_s$ is sequence duration).

In some aspects, the set of parameters includes a parameter indicating a sampling time (E) associated with the waveform. In some aspects, the sampling time $\in$ may be a fractional number between 0 and 1 (e.g., $0<\in<1$). In some aspects, the sampling time e may be a pre-defined quantized value that is configured on the transmitter node 410.

In some aspects, the set of parameters includes a parameter indicating a chirp type of the FMCW chirp associated with the waveform. For example, the set of parameters may include an up-chirp indication or a down-chirp indication associated with the FMCW chirp. In some aspects, the chirp type may be indicated as a binary parameter (e.g., where a value of 0 indicates an up-chirp and a value of 1 indicates a down-chirp). Additionally, or alternatively, the chirp type may be indicated by signaling another parameter (e.g., B or T) using a positive value (e.g., to indicate an up-chirp) or a negative value (e.g., to indicate a down-chirp).

In some aspects, the set of parameters includes a parameter indicating a sampling frequency ($f_s$) associated with the waveform. In some aspects, the sampling frequency $f_s$ may be indicated using the expansion factor $\alpha$ (e.g., $f_s=\alpha B$). In some aspects, the sampling frequency $f_s$ may be indicated in terms of a quantity of RBs or using an exact value (e.g., in a compressed format).

In some aspects, the network entity 405 may determine the set of parameters based at least in part on an index indicating a particular set of parameters, with the particular set of parameters being one of a plurality of sets of parameters indicated in a codebook table configured on the transmitter node 410. That is, in some aspects, one or more parameters of the waveform may be determined based at least in part on a pre-defined codebook or table (e.g., with acceptable ISAC properties). In one example of such an aspect, the network entity 405 may indicate, to the transmitter node 410, the index indicating the particular set of parameters from the codebook or table.

In some aspects, the network entity 405 may determine the set of parameters based at least in part on an indication indicating a value (e.g., a value for a parameter), with the value being one of a plurality of values that are configured on the transmitter node 410. That is, in some aspects, one or more parameters of the waveform may be determined based at least in part on parameter values that are configured (e.g., RRC configured) on the transmitter node 410. Here, the network entity 405 may indicate, to the transmitter node 410, which parameter value is to be used by the transmitter node 410. In some aspects, configuration of the plurality of values may be performed (e.g., by the network entity 405) dynamically depending on communication capability and congestion in a network.

In some aspects, the set of parameters may include one or more parameters associated with a rule, associated with generating the waveform, configured on the transmitter node 410. In some aspects, the rule associated with generating the waveform can be configured on the transmitter node 410 (e.g., pre-defined, dynamically indicated using rule parameters, or the like). In one example, a waveform can be defined using a rule indicating a polynomial approximation function for a phase of the waveform. In such an example, indication of one or more parameters may include indicating values of coefficients of the polynomial approximation function.

In some aspects, the waveform may be associated with a time-frequency comb type and a repetition parameter within a coherent processing interval (CPI). That is, in some aspects, the waveform may be defined for a time-frequency comb type with a (variable) repetition parameter within a CPI. In one example, each reference signal (RS) symbol within a CPI may use the same waveform. Alternatively, in another example, waveforms may differ among one or more RS symbols within the CPI. In some aspects, different unique waveforms can be defined (e.g., as described above) at a start of the CPI along with corresponding time/frequency locations. In some aspects, a dwell time comprises one or more CPIs with the same waveform time-frequency configuration, with the dwell time being defined with a CPI configuration and periodicity parameter in the time domain. In some aspects, a dwell time may include i (i>1) CPIs with at least partially different waveform configurations in time/frequency. In such an aspect, different waveforms can be specified for an $i^{th}$ CPI within the dwell time.

In some aspects, the waveform is associated with a circulant shift. In one example, a waveform can be defined using an integer circulant shift in time or frequency domain. In another example, a set of waveforms can be defined or indicated using a base waveform and different circulant shifts within a CPI or a dwell time (e.g., to support MIMO ISAC operation).

In some aspects, the set of parameters may include one or more parameters for a transition region for the waveform. Here, the transition region is a region of a frequency spectrum of the waveform in which a power spectral density is less than an average power spectral density of a core region of the frequency spectrum of the waveform. Additional details regarding such a transition region are described below with respect to FIGS. 5A-5F.

In some aspects, the network entity 405 may determine the set of parameters based at least in part on receiving a sensing request received from the transmitter node 410 or from a receiver node 415. That is, in some aspects, the transmitter node 410 or a receiver node 415 may transmit, and the network entity 405 may receive, a request associated with initiating sensing. The network entity 405 may receive the request and may determine the set of parameters for the waveform accordingly. In some aspects, the network entity 405 may determine the set of parameters so as to ensure adequate performance (e.g., ISAC performance) with an acceptable aggregated signal-to-interference-plus-noise ratio (SINR).

As shown at reference 452, the network entity 405 may transmit, and the transmitter node 410 may receive, information associated with the set of parameters for the waveform to be transmitted by the transmitter node 410. In some aspects, the transmitter node 410 may accept the set of parameters. Additionally, or alternatively, the transmitter node 410 may in some aspects request a modification of one or more parameters for the waveform as indicated by the network entity 405 (e.g., based on a pre-defined codebook or set of rules configured on the transmitter node 410). In such an aspect, the transmitter node 410 may transmit the request associated with modifying the initial set of parameters to the network entity 405, and the network entity 405 may respond accordingly (e.g., a response including approval or modification information that approves, denies, or further modifies the requested modification).

In this way, the transmitter node 410 may determine the set of parameters for the waveform to be transmitted by the transmitter node 410, with the waveform being configured to use an allocated bandwidth that is larger than the sweeping bandwidth B of the FMCW chirp.

In some aspects, the network entity 405 may transmit information associated with the set of parameters for reception by the one or more receiver nodes 415 (e.g., to facilitate processing in multi-static sensing, to facilitate processing for interference cancellation, or the like).

In some aspects, the transmitter node 410 may determine one or more parameters in the set of parameters (e.g., rather than, or in addition to, one or more parameters being signaled to the transmitter node 410 by the network entity 405). That is, in some aspects, the transmitter node 410 may determine one or more parameters in the set of parameters (e.g., in a manner similar to those described above with respect to reference 450). In such aspects, the transmitter node 410 may transmit information associated with the set of parameters for reception by at least one of the network entity 405 (e.g., over a Uu link) or the one or more receiver nodes 415 (e.g., over a sidelink).

As shown at reference 454, the transmitter node 410 may transmit the waveform according to the set of parameters. That is, the transmitter node 410 may determine the set of parameters for the waveform that is to use an allocated bandwidth that is larger than the sweeping bandwidth of the FMCW chirp, and may transmit the waveform accordingly. In this way, the transmitter node 410 may transmit a waveform with improved PAPR and sensing performance (e.g., as compared to traditional ZC) by, for example, reducing degradation due to aliasing or eliminating aliasing. As a result, a chirp-based sequence design with improved PAPR and sensing performance can be realized, thereby improving performance in system that supports a sensing functionality (e.g., ISAC functionality).

In some aspects, the techniques and apparatuses described herein with respect to FIG. 4 can be applied to monostatic sensing, bistatic sensing, or multi-static sensing.

As indicated above, FIG. 4 is provided as an example. Other examples may differ from what is described with respect to FIG. 4.

FIGS. 5A-5F are diagrams associated with an enhanced waveform comprising a transition region, in accordance with the present disclosure.

Figure 5A:
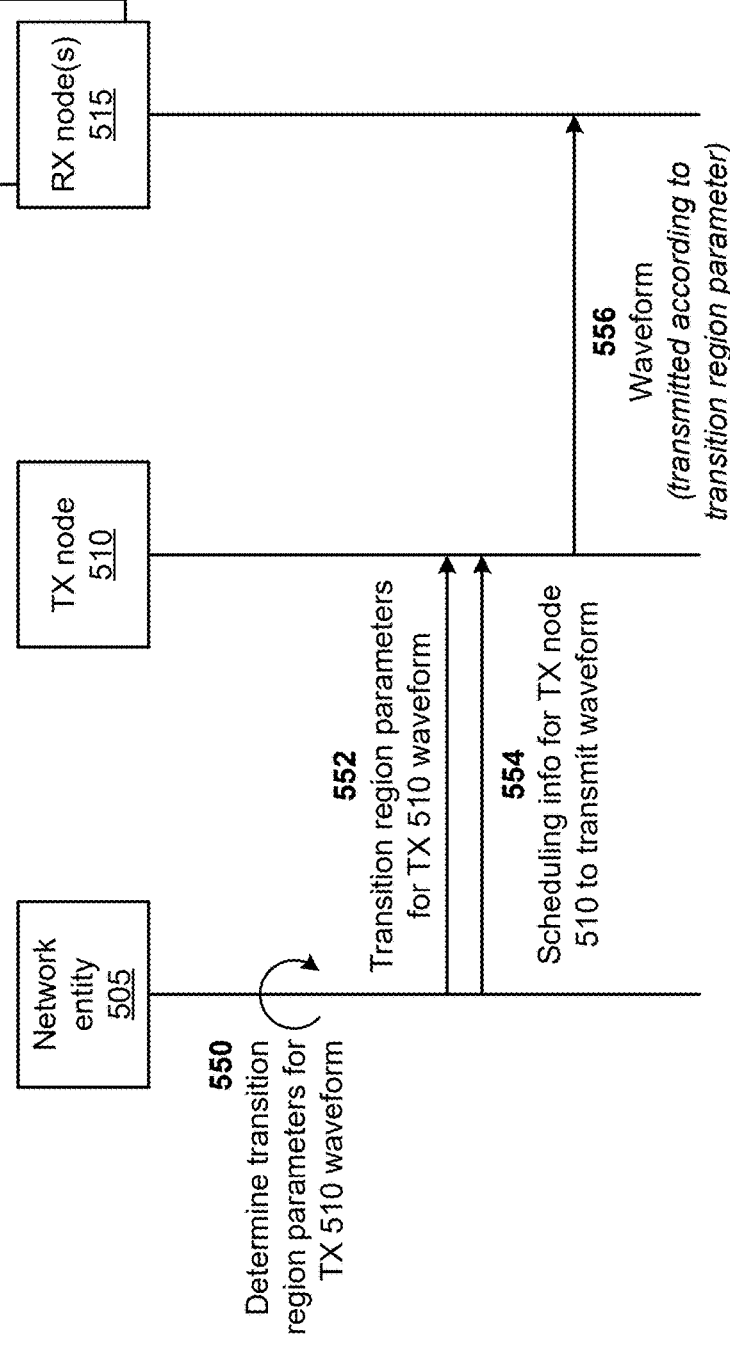
FIGS. 5A-5F are diagrams associated with an enhanced waveform comprising a transition region, in accordance with the present disclosure.

FIG. 5A is a diagram illustrating an example 500 associated with an enhanced waveform comprising a transition region. As shown in FIG. 5A, example 500 includes communication between a network entity 505, a transmitter (TX) node 510, and one or more receiver (RX) nodes 515. In some aspects, the network entity 505, the transmitter node 510, and the one or more receiver nodes 515 may be included in a wireless network, such as wireless network 100. In some aspects, the network entity 505 may correspond to a network node 110, a UE 120, or a sensing device 170 described above with respect to FIG. 1. In some aspects, the network entity 505 may include, for example, a base station, an SnMF, an RSU, or a PRU. In some aspects, the transmitter node 510 may correspond to a UE 120, a sensing device 170, or a network node 110 described above with respect to FIG. 1. In some aspects, the transmitter node 510 includes a UE, a base station, an RSU, or a PRU. In some aspects, a receiver node 515 may correspond to a UE 120, a sensing device 170, or a network node 110 as described above with respect to FIG. 1.

As shown at reference 550, the network entity 505 may determine a set of parameters for a waveform to be transmitted by the transmitter node 510 node. In some aspects, the set of parameters includes one or more parameters for a transition region for the waveform. As used herein, a transition region is a region of a frequency spectrum of a waveform in which a power spectral density is less than an average power spectral density of a core region of the frequency spectrum of the waveform. In some aspects, the core region may or may not be compatible with legacy devices in the wireless communication system.

Figure 5B:
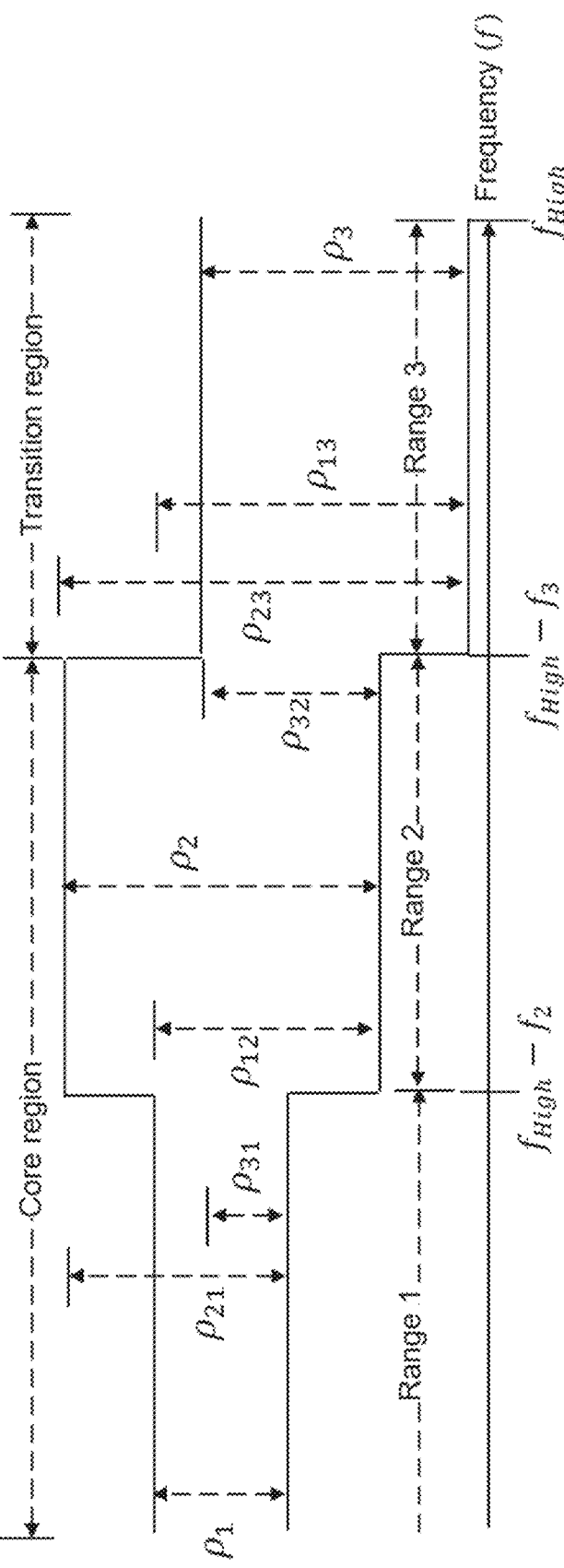

With reference to FIG. 5B, the transition region may in some aspects be defined based at least in part on a set of parameters associated with three frequency ranges. In the example shown in FIG. 5B, the one or more parameters associated with the transition region include a parameter indicating a power level range ($\rho\_3$) in the transition region (Range 3). As further shown, the one or more parameters associated with the transition region include a parameter indicating a difference between a maximum of a power level range ($\rho_1$) in a first portion of the core region (Range 1) and a minimum of the power level range ($\rho_3$) in the transition region (e.g., $\rho_{13}$=max (Range 1)–min (Range 3)). As further shown, the one or more parameters associated with the transition region include a parameter indicating a difference between a maximum of a power level range ($\rho_2$) in a second portion of the core region (Range 2) and the minimum of the power level range ($\rho_3$) in the transition region (Range 3) (e.g., $\rho_{23}$=max (Range 2)–min (Range 3)). As further shown, the one or more parameters associated with the transition region include a parameter indicating a difference between a maximum of the power level range ($\rho_3$) in the transition region (Range 3) and a minimum of the power level range ($\rho_1$) in the first portion of the core region (Range 1) (e.g., $\rho_{31}$=max (Range 3)–min (Range 1)). As further shown, the one or more parameters associated with the transition region include a parameter indicating a difference between a maximum of the power level range ($\rho_3$) in the transition region (Range 3) and a minimum of the power level range ($\rho_2$) in the second portion of the core region (Range 2) (e.g., $\rho_{32}$=max (Range 3)–min (Range 2)). In some such aspects, one or more rules may be configured (e.g., $\rho_{31}{<}\rho_1$) so as to ensure a fall-off of the frequency spectrum at edges of the waveform.

Figure 5C:
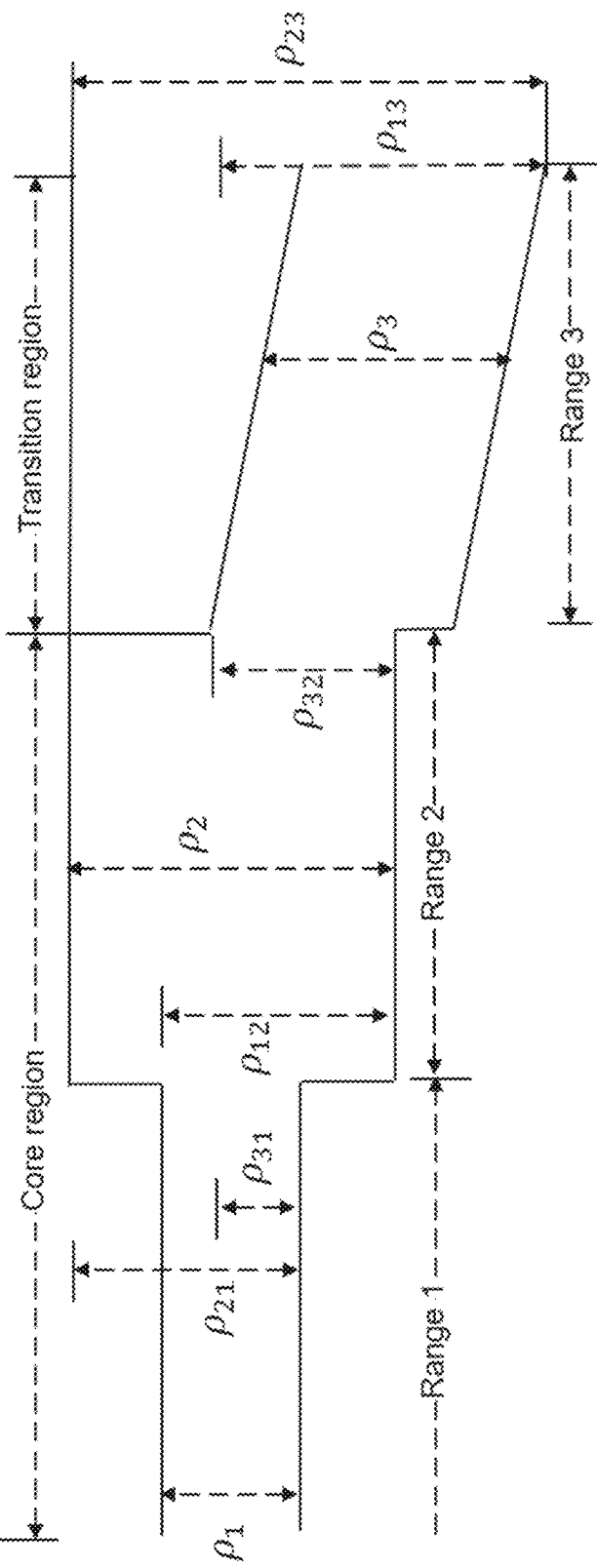

With reference to FIG. 5C, the transition region may in some aspects be defined based at least in part on a set of parameters associated with three frequency ranges (e.g., as described with respect to FIG. 5B) and a parameter indicating a slope associated with the power level range ($\rho_3$) in the transition region (Range 3). In this way, the transition region can be defined using a range with sloped upper and lower boundaries.

Figure 5D:
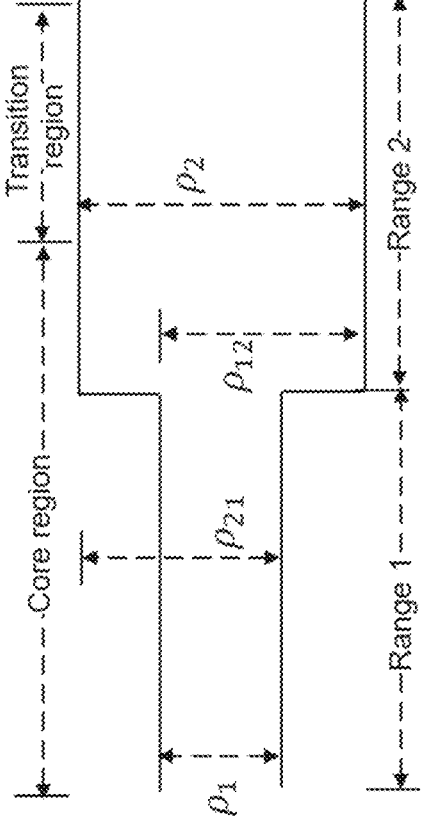

With reference to FIG. 5D, the transition region may in some aspects be defined based at least in part on a set of parameters associated with two frequency ranges. In the example shown in FIG. 5D, the one or more parameters associated with the transition region include a parameter indicating a power level range ($\rho_2$) in at least a region comprising a second portion of the core region and the transition region (Range2). As further shown, the one or more parameters associated with the transition region include a parameter indicating a difference between a maximum of a power level range ($\rho_1$) in a first portion of the core region (Range 1) and a minimum of the power level range ($\rho_2$) in the region comprising the second portion of the core region and the transition region (Range 2) (e.g., $\rho_{12}$=max (Range 1)–min (Range 2)). As further shown, the one or more parameters associated with the transition region include a parameter indicating a difference between a maximum of the power level range ($\rho_2$) in the region comprising a second portion of the core region and the transition region (Range 2) and a minimum of the power level range ($\rho_1$) in the first portion of the core region (Range 1) (e.g., $\rho_{21}$=max (Range 2)–min (Range 1)). In some such aspects, a pre-defined set of ($\rho_2$, $\rho_{12}$, $\rho_{21}$) parameters may be used for an area including only legacy devices, and a different pre-defined set of ($\rho_2$, $\rho_{12}$, $\rho_{21}$) parameters may be used for an area including legacy devices and devices with a capability to transmit a waveform including a transition region as described herein. Further, in some aspects, the region comprising a second portion of the core region and the transition region (Range 2) may be subdivided into a plurality of sub-ranges (e.g., Range 2-1 and Range 2-2). In such an aspect, core region rules may be applied to one or more sub-ranges (e.g., Range 2-1) with a first set of parameters $$(\text{e.g., } \rho_2^1, \rho_{12}^1, \rho_{21}^1)$$

and transition region rules may be applied to one or more other sub-ranges (e.g., Range 2-2) with a second (different) set of parameters $$(\text{e.g., } \rho_2^2, \rho_{12}^2, \rho_{21}^2)$$

to enable transmission of waveforms including transition regions. In some aspects, definition of the transition region based at least in part on a set of parameters associated with two frequency ranges enables more constraint on transition region specifications based on core region specifications. In one example, common rules may be applied to each of a plurality of sub-ranges (e.g., Range 2-1 and Range 2-2) (e.g., a relationship between $$[\rho_2^1, \rho_{12}^1, \rho_{21}^1] \text{ and } [\rho_2^2, \rho_{12}^2, \rho_{21}^2]).$$

In some aspects, a slope of the region comprising the second portion of the core region and the transition region (Range 2) may be the same between the core region and the transition region.

In some aspects, the set of parameters includes one or more parameters for a second transition region for the waveform. In this way, a waveform may have a first transition region and a second transition region, with one or more parameters associated with the first transition region being different from one or more corresponding parameters of the second transition region (e.g., such that percentages of total power differ between the first transition region and the second transition region). In some such aspects, a given transition region may have its own respective set of rules, such as a rule indicating a maximum percentage of power, a rule indicating a minimum percentage of power, a rule indicating a maximum roll-off in dB per decade or a set of boundary curves, or a rule indicating a start or end frequency (e.g., in an absolute sense or relative to the core region frequency range), among other examples. In some aspects, a rule between a set of transition regions may be configured (e.g., a percentage of total maximum or minimum power).

In some aspects, the network entity 505 may determine the set of parameters so as to reduce performance degradation resulting from scheduling of the transmitter node 510 and another transmitter node 510 for concurrent transmission. That is, in some aspects, the one or more parameters for the transition region may be determined such that performance degradation resulting from co-scheduling of transmitter nodes 510 is reduced.

In some aspects, the network entity 505 may determine the one or more parameters for the transition region based at least in part on transition region configuration information. For example, the transmitter node 510 may transmit, and the network entity 505 may receive, transition region configuration information, and the network entity 505 may determine the one or more parameters accordingly. In one example, the transmitter node 510 may transmit a capability report including optimal transition region configuration parameters (or a set of chosen or supported transition region parameters). In some aspects, the transition region configuration information may include information associated with a shape of a non-constant waveform at an edge of the waveform, such as a roll-off in dB per decade, a start and end of the waveform in the transition region, or a power spectral density (PSD) constraint (e.g., a percentage of power or PSD profile in terms of a polynomial equation, with coefficients being indicated) needed in a region for a particular waveform, among other examples.

In some aspects, the one or more parameters associated with the transition region are determined based at least in part on a set of transition region parameters configured on the network entity 505 (e.g., according to a wireless communication standard). The set of transition region parameters may include, for example, a parameter indicating a maximum permissible signal power allocation associated with the transition region (e.g., a parameter indicating that no more than X % of a total signal power is to be allocated within the transition region, while the remaining (100–X) % of signal power is in the core region). In some aspects, the set of transition region parameters may be configured in association with enabling an error vector magnitude (EVM) measurement (e.g., as described in an applicable wireless communication standard).

In some aspects, the network entity 505 may determine the set of parameters based at least in part on capability information associated with the transmitter node 510. For example, in some aspects, the transmitter node 510 may transmit, and the network entity 505 may receive, capability information indicating a capability of the transmitter node 510 with respect to transmission or reception of a waveform including a transition region (e.g., an enhanced waveform to support ISAC functionality), and the network entity 505 may determine the set of parameters according to the capability information.

In some aspects, the set of parameters may include one or more parameters associated with generating a waveform that uses an allocated bandwidth that is larger than a sweeping bandwidth of an FMCW chirp. Additional details regarding such a waveform are described above with respect to FIG. 4.

In some aspects, the network entity 505 may determine the set of parameters based at least in part on receiving a sensing request received from the transmitter node 510 or from a receiver node 515. That is, in some aspects, the transmitter node 510 or a receiver node 515 may transmit, and the network entity 505 may receive, a request associated with initiating sensing. The network entity 505 may receive the request and may determine the set of parameters for the waveform accordingly. In some aspects, the network entity 505 may determine the set of parameters so as to ensure adequate performance (e.g., ISAC performance) with an acceptable aggregated SINR.

In some aspects, the network entity 505 may determine a set of parameters for a plurality of transmitter nodes 510, each including one or more parameters for a transition region, for a plurality of transmitter nodes 510 (e.g., in a manner similar to that described above).

As shown at reference 552 in FIG. 5A, the network entity 505 may transmit, and the transmitter node 510 may receive, information associated with the set of parameters for the waveform to be transmitted by the transmitter node 510. In some aspects, the transmitter node 510 may accept the set of parameters. Additionally, or alternatively, the transmitter node 510 may in some aspects request a modification of one or more parameters for the waveform as indicated by the network entity 505 (e.g., based on a pre-defined codebook or set of rules configured on the transmitter node 510). In such an aspect, the transmitter node 510 may transmit the request associated with modifying the initial set of parameters to the network entity 505, and the network entity 505 may respond accordingly (e.g., a response including approval or modification information that approves, denies, or further modifies the requested modification).

In this way, the transmitter node 510 may determine the set of parameters for the waveform to be transmitted by the transmitter node 510, with the set of parameters including one or more parameters for a transition region of the waveform.

In some aspects, the network entity 505 may transmit information associated with the set of parameters for reception by the one or more receiver nodes 515 (e.g., to facilitate processing in multi-static sensing, to facilitate processing for interference cancellation, or the like).

In some aspects, the transmitter node 510 may determine one or more parameters in the set of parameters (e.g., rather than or in addition to one or more parameters being signaled to the transmitter node 510 by the network entity 505). That is, in some aspects, the transmitter node 510 may determine one or more parameters in the set of parameters (e.g., in a manner similar to that described above with respect to reference 550). In such aspects, the transmitter node 510 may transmit information associated with the set of parameters for reception by at least one of the network entity 505 (e.g., over a Uu link) or the one or more receiver nodes 515 (e.g., over a sidelink).

As shown at reference 554, the network entity 505 may transmit, and the transmitter node 510 may receive, scheduling information for the transmitter node 510 to transmit the waveform according to the set of parameters. That is, the network entity 505 may schedule the transmitter node 510 to transmit the waveform (e.g., in support of ISAC functionality) based at least in part on the set of parameters (e.g., such that the waveform will include the transition region as configured by the set of parameters).

In some aspects, the network entity 505 may determine an interference measurement associated with the transition region prior to transmitting the scheduling information for scheduling the transmitter node 510 to transmit the waveform. That is, in some aspects, the network entity 505 may determine an interference measurement for the transition region (e.g., in a selected beam direction, such as a beam direction indicated in a sensing request).

In some aspects, the network entity 505 may transmit scheduling information for scheduling multiple transmitter nodes 510 to transmit at least partially overlapping waveforms. For example, the network entity 505 may transmit first scheduling information for scheduling a first transmitter node 510 to transmit a first waveform according to a first set of parameters including one or more parameters associated with a first transition region. In this example, the network entity 505 may also transmit second scheduling information for scheduling a second transmitter node 510 to transmit a second waveform (e.g., according to a second set of parameters including one or more parameters associated with a second transition region). Here, a frequency spectrum of the second waveform may at least partially overlap the transition region of the first waveform. That is, the first transmitter node 510 and the second transmitter node 510 may be scheduled for concurrent transmission. In some aspects, as noted above, the first set of parameters associated with the first waveform may be selected so as to reduce performance degradation resulting from scheduling of the first transmitter node 510 and the second transmitter node 510 for concurrent transmission. In some such aspects, the network entity 505 may determine an interference measurement associated with the transition region prior to transmitting the second scheduling information to the second transmitter node 510 in association with transmission of the second waveform. That is, the network entity 505 may in some aspects measure (or assign a set of network nodes to measure) interference power in the transition region before assigning another transmitter node 510 to the same transition region.

Figure 5E:
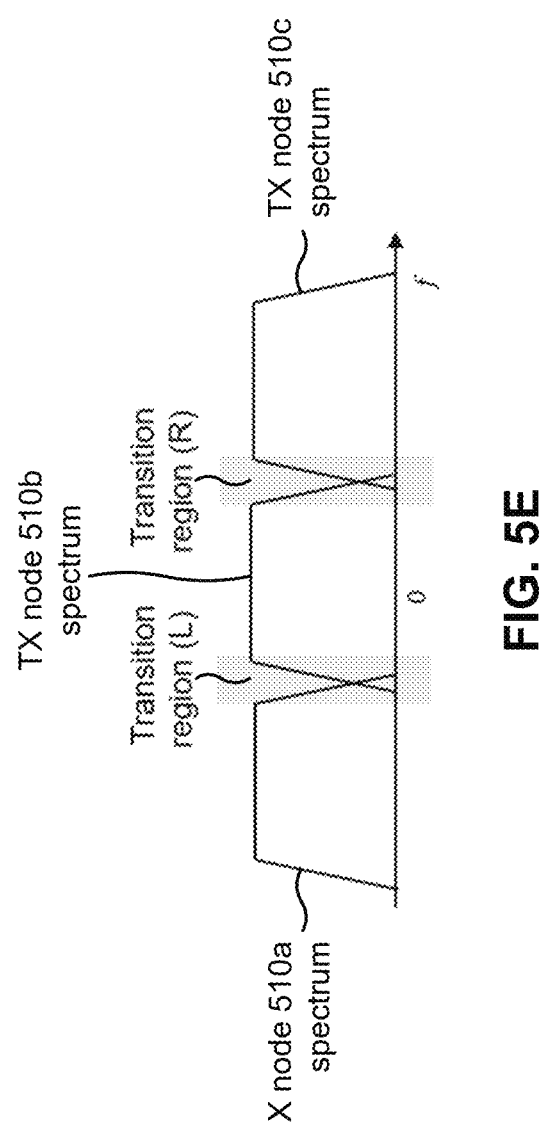
Figure 5F:
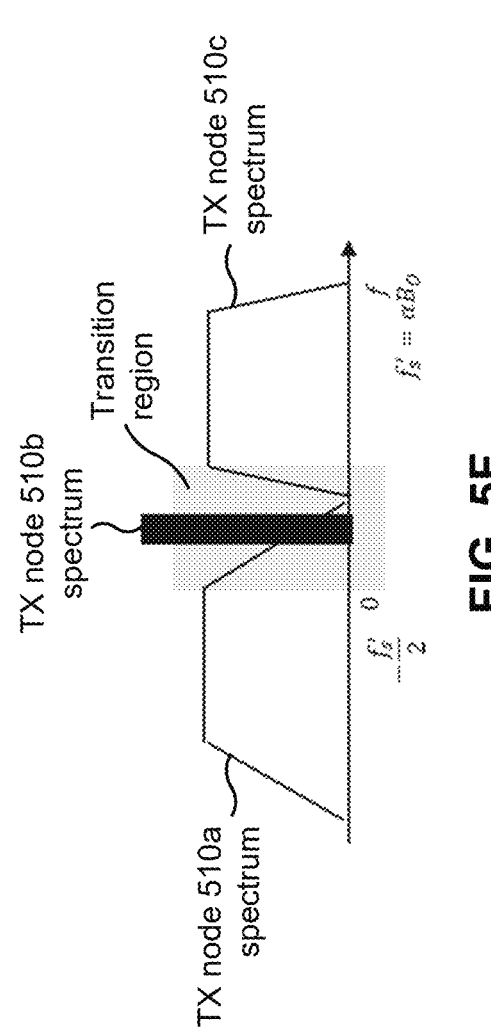

In some aspects, a plurality of transmitter nodes 510 can be allocated to the transition region. FIG. 5E is a diagram illustrating an example in which two transmitter nodes 510 are allocated to a given transition region (e.g., transmitter node 510a and transmitter node 510b are allocated to transition region (L), and transmitter node 510b and transmitter node 510c are allocated to transition region (R)). FIG. 5F is a diagram illustrating an example in which three transmitter nodes 510 (e.g., transmitter node 510a, transmitter node 510b, and transmitter node 510c) are allocated to a single transition region. As illustrated by transmitter node 510b in the example shown in FIG. 5F, a transmitter node 510 may in some aspects be allocated a transition region without a core region (e.g., a peaky waveform, which may have a smaller bandwidth and higher power than neighboring waveforms).

In some aspects, a transmitter node 510 transition region may be fully or partially used by a transmitter node 510. In other words, a transition region may be configured so as to have a partial overlap or a full overlap between different transmitter nodes 510. In one example, the network entity 505 may select an optimal set of waveforms that will result in a lowest amount of interference when overlapping in the transition region. As a particular example, an upchirp and a downchirp can be selected for the transmitter node 510a and the transmitter node 510b in the example shown in FIG. 5E so as to reduce interference.

As shown at reference 556 in FIG. 5A, the transmitter node 510 may transmit the waveform according to the set of parameters (e.g., such that the waveform includes a transition region). That is, the transmitter node 510 may determine the set of parameters for the waveform that includes the transition region, and may transmit the waveform accordingly.

In some aspects, the network entity 505 or the transmitter node 510 may (e.g., after transmission of the waveform by the transmitter node 510) receive feedback or interference information from a receiver node 515. The feedback or interference information may include, for example, information indicative of one or more metrics associated with sensing performed based at least in part on the waveform or one or more metrics associated with interference associated with the waveform. In some aspects, the network entity 505 or the transmitter node 510 may use such feedback or interference information to perform iterative refinement of the waveform (e.g., to improve ISAC performance).

As indicated above, FIGS. 5A-5F are provided as examples. Other examples may differ from what is described with respect to FIGS. 5A-5F.

Figure 6:
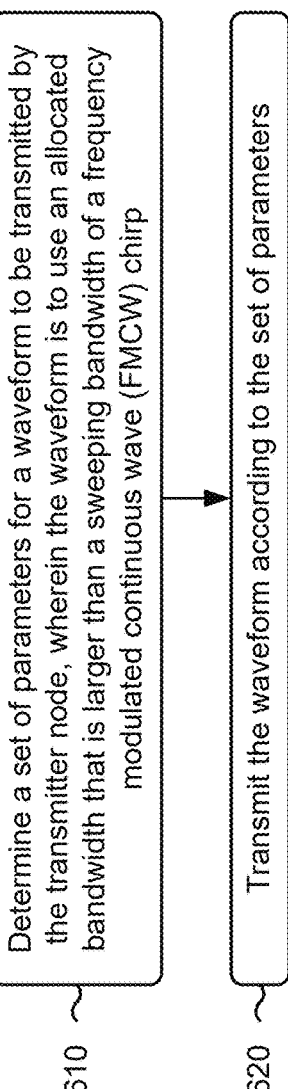
FIG. 6 is a diagram illustrating an example process performed, for example, at a transmitter node or an apparatus of a transmitter node, in accordance with the present disclosure.

FIG. 6 is a diagram illustrating an example process 600 performed, for example, at a transmitter node or an apparatus of a transmitter node, in accordance with the present disclosure. Example process 600 is an example where the apparatus or the transmitter node (e.g., transmitter node 410) performs operations associated with an enhanced ISAC waveform.

As shown in FIG. 6, in some aspects, process 600 may include determining a set of parameters for a waveform to be transmitted by the transmitter node, wherein the waveform is to use an allocated bandwidth that is larger than a sweeping bandwidth of an FMCW chirp (block 610). For example, the transmitter node (e.g., using communication manager 1006, depicted in FIG. 10) may determine a set of parameters for a waveform to be transmitted by the transmitter node, wherein the waveform is to use an allocated bandwidth that is larger than a sweeping bandwidth of an FMCW chirp, as described above.

As further shown in FIG. 6, in some aspects, process 600 may include transmitting the waveform according to the set of parameters (block 620). For example, the transmitter node (e.g., using transmission component 1004 and/or communication manager 1006, depicted in FIG. 10) may transmit the waveform according to the set of parameters, as described above.

Process 600 may include additional aspects, such as any single aspect or any combination of aspects described below and/or in connection with one or more other processes described elsewhere herein.

In a first aspect, the waveform is a sensing waveform.

In a second aspect, the waveform is an OFDM-based waveform.

In a third aspect, the FMCW chirp is an LFM chirp.

In a fourth aspect, the waveform is based at least in part on an enhanced aliased Zadoff-Chu sequence.

In a fifth aspect, the waveform is based at least in part on an enhanced truncated Zadoff-Chu sequence.

In a sixth aspect, the set of parameters includes one or more parameters associated with determining the sweeping bandwidth of the FMCW chirp.

In a seventh aspect, the one or more parameters include a parameter indicating an integer number of resource blocks and a parameter indicating a subcarrier spacing.

In an eighth aspect, the one or more parameters include a parameter indicating a Zadoff-Chu equivalent integer number of resource blocks and a parameter indicating an expansion factor.

In a ninth aspect, the set of parameters includes one or more parameters associated with determining a time duration of the FMCW chirp.

In a tenth aspect, the one or more parameters include a parameter indicating a number of symbol durations.

In an eleventh aspect, the one or more parameters include a parameter indicating a sequence length.

In a twelfth aspect, the set of parameters includes a parameter indicating a sampling time.

In a thirteenth aspect, the set of parameters includes a parameter indicating a chirp type.

In a fourteenth aspect, the set of parameters includes a parameter indicating a sampling frequency.

In a fifteenth aspect, the set of parameters is determined based at least in part on an index indicating a particular set of parameters, the particular set of parameters being one of a plurality of sets of parameters indicated in a codebook table configured on the transmitter node.

In a sixteenth aspect, the set of parameters is determined based at least in part on an indication indicating a value, the value being one of a plurality of values that are configured on the transmitter node.

In a seventeenth aspect, the set of parameters includes one or more parameters associated with a rule, associated with generating the waveform, configured on the transmitter node.

In an eighteenth aspect, the waveform is associated with a time-frequency comb type and a repetition parameter within a CPI.

In a nineteenth aspect, the waveform is associated with a circulant shift.

In a twentieth aspect, determining the set of parameters comprises receiving the set of parameters from a network entity.

In a twenty-first aspect, process 600 includes determining the set of parameters based at least in part on an initial set of parameters and a codebook or set of rules.

In a twenty-second aspect, process 600 includes transmitting information associated with the set of parameters for reception by at least one of a network entity or a receiver node.

In a twenty-third aspect, the set of parameters includes one or more parameters for a transition region for the waveform, wherein the transition region is a region of a frequency spectrum of the waveform in which a power spectral density is less than an average power spectral density of a core region of the frequency spectrum of the waveform.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
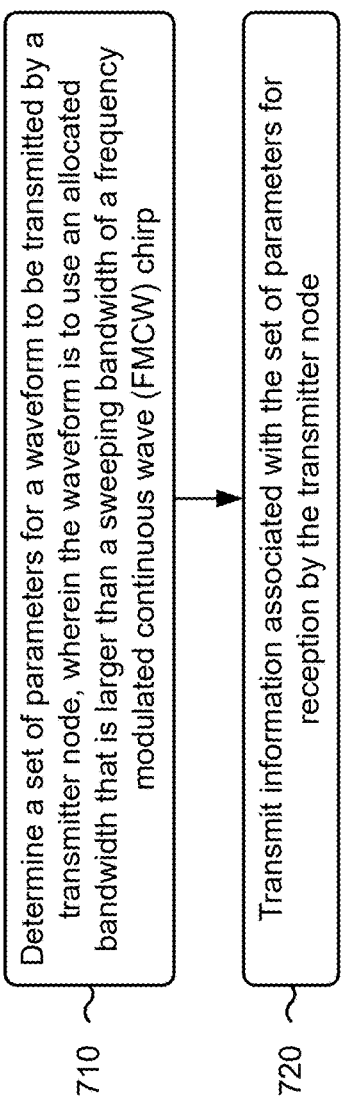
FIG. 7 is a diagram illustrating an example process performed, for example, at a network entity or an apparatus of a network entity, in accordance with the present disclosure.

FIG. 7 is a diagram illustrating an example process 700 performed, for example, at a network entity or an apparatus of a network entity, in accordance with the present disclosure. Example process 700 is an example where the apparatus or the network entity (e.g., network entity 405) performs operations associated with an enhanced ISAC waveform.

As shown in FIG. 7, in some aspects, process 700 may include determining a set of parameters for a waveform to be transmitted by a transmitter node, wherein the waveform is to use an allocated bandwidth that is larger than a sweeping bandwidth of an FMCW chirp (block 710). For example, the network entity (e.g., using communication manager 1106, depicted in FIG. 11) may determine a set of parameters for a waveform to be transmitted by a transmitter node, wherein the waveform is to use an allocated bandwidth that is larger than a sweeping bandwidth of an FMCW chirp, as described above.

As further shown in FIG. 7, in some aspects, process 700 may include transmitting information associated with the set of parameters for reception by the transmitter node (block 720). For example, the network entity (e.g., using transmission component 1104 and/or communication manager 1106, depicted in FIG. 11) may transmit information associated with the set of parameters for reception by the transmitter node, as described above.

Process 700 may include additional aspects, such as any single aspect or any combination of aspects described below and/or in connection with one or more other processes described elsewhere herein.

In a first aspect, the waveform is a sensing waveform.

In a second aspect, the waveform is an OFDM-based waveform.

In a third aspect, the FMCW chirp is an LFM chirp.

In a fourth aspect, the waveform is based at least in part on an enhanced aliased Zadoff-Chu sequence.

In a fifth aspect, the waveform is based at least in part on an enhanced truncated Zadoff-Chu sequence.

In a sixth aspect, the set of parameters includes one or more parameters associated with determining the sweeping bandwidth of the FMCW chirp.

In a seventh aspect, the one or more parameters include a parameter indicating an integer number of resource blocks and a parameter indicating a subcarrier spacing.

In an eighth aspect, the one or more parameters include a parameter indicating a Zadoff-Chu equivalent integer number of resource blocks and a parameter indicating an expansion factor.

In a ninth aspect, the set of parameters includes one or more parameters associated with determining a time duration of the FMCW chirp.

In a tenth aspect, the one or more parameters include a parameter indicating a number of symbol durations.

In an eleventh aspect, the one or more parameters include a parameter indicating a sequence length.

In a twelfth aspect, the set of parameters includes a parameter indicating a sampling time.

In a thirteenth aspect, the set of parameters includes a parameter indicating a chirp type.

In a fourteenth aspect, the set of parameters includes a parameter indicating a sampling frequency.

In a fifteenth aspect, the set of parameters is determined based at least in part on an index indicating the set of parameters, the set of parameters being one of a plurality of sets of parameters indicated in a codebook table configured on the transmitter node.

In a sixteenth aspect, the set of parameters is determined based at least in part on an indication indicating a value, the value being one of a plurality of values that are configured on the transmitter node.

In a seventeenth aspect, the set of parameters includes one or more parameters associated with a rule, associated with generating the waveform, configured on the transmitter node.

In an eighteenth aspect, the waveform is associated with a time-frequency comb type and a repetition parameter within a CPI.

In a nineteenth aspect, the waveform is associated with a circulant shift.

In a twentieth aspect, the set of parameters is determined based at least in part on receiving a sensing request received from the transmitter node or from a receiver node.

In a twenty-first aspect, process 700 includes transmitting information associated with the set of parameters for reception by one or more receiver nodes.

In a twenty-second aspect, the set of parameters includes one or more parameters for a transition region for the waveform, wherein the transition region is a region of a frequency spectrum of the waveform in which a power spectral density is less than an average power spectral density of a core region of the frequency spectrum of the waveform.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a diagram illustrating an example process 800 performed, for example, at a network entity or an apparatus of a network entity, in accordance with the present disclosure. Example process 800 is an example where the apparatus or the network entity (e.g., network entity 405) performs operations associated with an enhanced ISAC waveform.

As shown in FIG. 8, in some aspects, process 800 may include determining a set of parameters for a first waveform to be transmitted by a first transmitter node, the set of parameters including one or more parameters for a transition region for the first waveform, wherein the transition region is a region of a frequency spectrum of the first waveform in which a power spectral density is less than an average power spectral density of a core region of the frequency spectrum of the first waveform (block 810). For example, the network entity (e.g., using communication manager 1106, depicted in FIG. 11) may determine a set of parameters for a first waveform to be transmitted by a first transmitter node, the set of parameters including one or more parameters for a transition region for the first waveform, wherein the transition region is a region of a frequency spectrum of the first waveform in which a power spectral density is less than an average power spectral density of a core region of the frequency spectrum of the first waveform, as described above.

As further shown in FIG. 8, in some aspects, process 800 may include transmitting scheduling information for the first transmitter node to transmit the first waveform according to the set of parameters (block 820). For example, the network entity (e.g., using transmission component 1104 and/or communication manager 1106, depicted in FIG. 11) may transmit scheduling information for the first transmitter node to transmit the first waveform according to the set of parameters, as described above.

Process 800 may include additional aspects, such as any single aspect or any combination of aspects described below and/or in connection with one or more other processes described elsewhere herein.

In a first aspect, process 800 includes transmitting scheduling information for scheduling a second transmitter node to transmit a second waveform, wherein a frequency spectrum of the second waveform at least partially overlaps the transition region of the first waveform.

In a second aspect, the set of parameters are determined so as to reduce performance degradation resulting from scheduling the second transmitter node and the first transmitter node for concurrent transmission.

In a third aspect, process 800 includes determining an interference measurement associated with the transition region prior to transmitting the scheduling information for scheduling the second transmitter node to transmit the second waveform.

In a fourth aspect, the network entity includes at least one of a base station, an SnMF, an RSU, or a PRU.

In a fifth aspect, the one or more parameters associated with the transition region are determined based at least in part on a set of transition region parameters configured on the network entity according to a wireless communication standard.

In a sixth aspect, the set of transition region parameters includes a parameter indicating a maximum permissible signal power allocation associated with the transition region.

In a seventh aspect, the set of transition region parameters are configured in association with enabling an error vector magnitude measurement.

In an eighth aspect, process 800 includes receiving capability information indicating a capability of the first transmitter node with respect to transmission or reception of a waveform including a transition region.

In a ninth aspect, the one or more parameters associated with the transition region include at least one of a parameter indicating a power level range in the transition region, a parameter indicating a difference between a maximum of a power level range in a first portion of the core region and a minimum of the power level range in the transition region, a parameter indicating a difference between a maximum of a power level range in a second portion of the core region and the minimum of the power level range in the transition region, a parameter indicating a difference between a maximum of the power level range in the transition region and a minimum of the power level range in the first portion of the core region, or a parameter indicating a difference between a maximum of the power level range in the transition region and a minimum of the power level range in the second portion of the core region.

In a tenth aspect, the one or more parameters further include a slope associated with the power level range in the transition region.

In an eleventh aspect, the one or more parameters associated with the transition region include at least one of a parameter indicating a power level range in at least a region comprising a second portion of the core region and the transition region, a parameter indicating a difference between a maximum of a power level range in a first portion of the core region and a minimum of the power level range in the region comprising the second portion of the core region and the transition region, or a parameter indicating a difference between a maximum of the power level range in the region comprising a second portion of the core region and the transition region and a minimum of the power level range in the first portion of the core region.

In a twelfth aspect, the set of parameters includes one or more parameters for a second transition region for the first waveform.

In a thirteenth aspect, process 800 includes receiving transition region configuration information from the first transmitter node, wherein the one or more parameters are determined based at least in part on the transition region configuration information.

In a fourteenth aspect, process 800 includes determining an interference measurement associated with the transition region prior to transmitting the scheduling information for scheduling the first transmitter node to transmit the first waveform.

In a fifteenth aspect, process 800 includes transmitting information associated with the set of parameters for reception by the first transmitter node.

In a sixteenth aspect, process 800 includes transmitting information associated with the set of parameters for reception by one or more receiver nodes.

In a seventeenth aspect, process 800 includes receiving feedback or interference information from at least one receiver node.

In an eighteenth aspect, the waveform is to use an allocated bandwidth that is larger than a sweeping bandwidth of an FMCW chirp.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

FIG. 9 is a diagram illustrating an example process 900 performed, for example, at a transmitter node or an apparatus of a transmitter node, in accordance with the present disclosure. Example process 900 is an example where the apparatus or the transmitter node (e.g., transmitter node 410) performs operations associated with an enhanced ISAC waveform.

As shown in FIG. 9, in some aspects, process 900 may include receiving scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform (block 910). For example, the transmitter node (e.g., using reception component 1002 and/or communication manager 1006, depicted in FIG. 10) may receive scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform, as described above.

As further shown in FIG. 9, in some aspects, process 900 may include transmitting the waveform based at least in part on the scheduling information and according to the set of parameters (block 920). For example, the transmitter node (e.g., using transmission component 1004 and/or communication manager 1006, depicted in FIG. 10) may transmit the waveform based at least in part on the scheduling information and according to the set of parameters, as described above.

Process 900 may include additional aspects, such as any single aspect or any combination of aspects described below and/or in connection with one or more other processes described elsewhere herein.

In a first aspect, the transmitter node includes at least one of a UE, a base station, an RSU, or a PRU.

In a second aspect, the one or more parameters associated with the transition region are based at least in part on a set of transition region parameters configured on the transmitter node according to a wireless communication standard.

In a third aspect, the set of transition region parameters includes a parameter indicating a maximum permissible signal power allocation associated with the transition region.

In a fourth aspect, the set of transition region parameters are configured in association with enabling an error vector magnitude measurement.

In a fifth aspect, process 900 includes transmitting capability information indicating a capability of the transmitter node with respect to transmission or reception of a waveform including a transition region.

In a sixth aspect, the one or more parameters associated with the transition region include at least one of a parameter indicating a power level range in the transition region, a parameter indicating a difference between a maximum of a power level range in a first portion of the core region and a minimum of the power level range in the transition region, a parameter indicating a difference between a maximum of a power level range in a second portion of the core region and the minimum of the power level range in the transition region, a parameter indicating a difference between a maximum of the power level range in the transition region and a minimum of the power level range in the first portion of the core region, or a parameter indicating a difference between a maximum of the power level range in the transition region and a minimum of the power level range in the second portion of the core region.

In a seventh aspect, the one or more parameters further include a slope associated with the power level range in the transition region.

In an eighth aspect, the one or more parameters associated with the transition region include at least one of a parameter indicating a power level range in at least a region comprising a second portion of the core region and the transition region, a parameter indicating a difference between a maximum of a power level range in a first portion of the core region and a minimum of the power level range in the region comprising the second portion of the core region and the transition region, or a parameter indicating a difference between a maximum of the power level range in the region comprising a second portion of the core region and the transition region and a minimum of the power level range in the first portion of the core region.

In a ninth aspect, the set of parameters includes one or more parameters for a second transition region for the waveform.

In a tenth aspect, process 900 includes transmitting a transition region configuration information, wherein the one or more parameters are based at least in part on the transition region configuration information transmitted by the transmitter node.

In an eleventh aspect, process 900 includes receiving information associated with the set of parameters from a network entity.

In a twelfth aspect, process 900 includes determining the set of parameters associated with the waveform, and transmitting information associated with the set of parameters for reception by at least one of a network entity or a receiver node.

In a thirteenth aspect, process 900 includes determining the set of parameters based at least in part on approval or modification information associated with an initial set of parameters, associated with the waveform, determined by the transmitter node.

In a fourteenth aspect, process 900 includes receiving feedback or interference information from at least one receiver node.

In a fifteenth aspect, the waveform is to use an allocated bandwidth that is larger than a sweeping bandwidth of an FMCW chirp.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
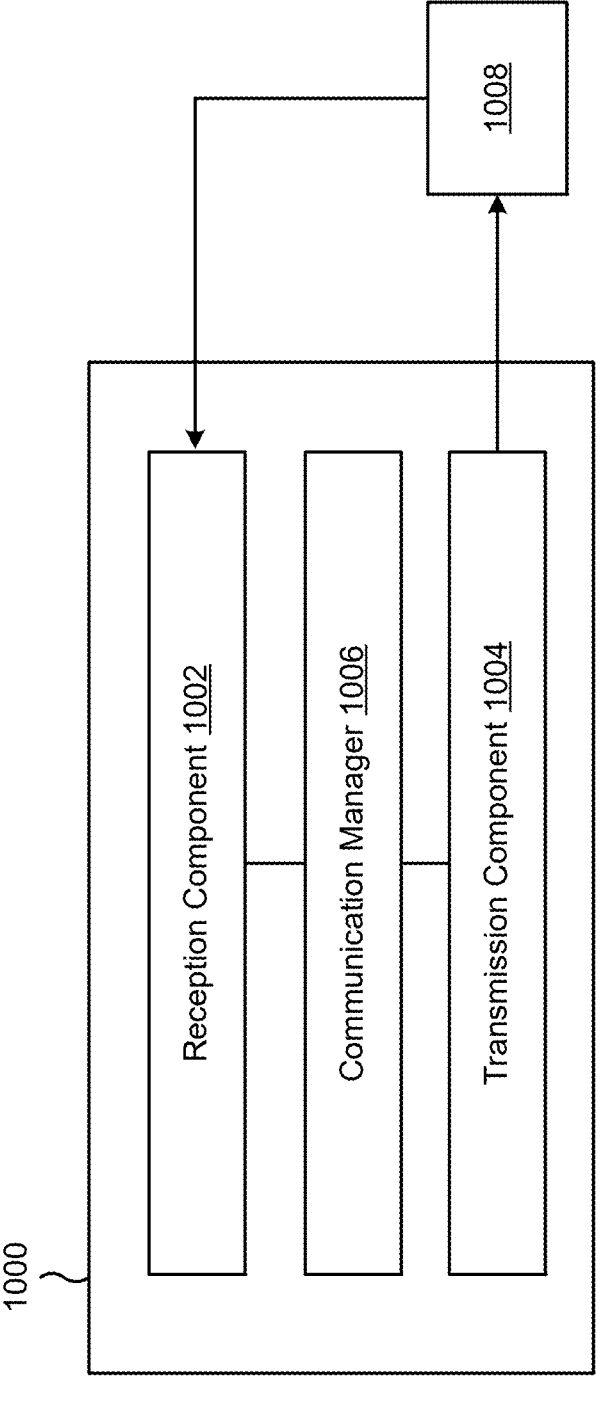
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a transmitter node, or a transmitter node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 or the communication manager 155 described in connection with FIG. 1. As shown, the apparatus 1000 may communicate with another apparatus 1008, such as a UE or a network node (such as a CU, a DU, an RU, or a base station), using the reception component 1002 and the transmission component 1004. The communication manager 1006 may be included in, or implemented via, a processing system (for example, the processing system 140 or the processing system 145 described in connection with FIG. 1.

In some aspects, the apparatus 1000 may be configured to perform one or more operations described herein in connection with FIGS. 4 and/or FIGS. 5A-5F. Additionally, or alternatively, the apparatus 1000 may be configured to perform one or more processes described herein, such as process 600 of FIG. 6, process 900 of FIG. 9, or a combination thereof. In some aspects, the apparatus 1000 and/or one or more components shown in FIG. 10 may include one or more components of the network node 110, the UE 120, or the sensing device 170 described in connection with FIG. 1. Additionally, or alternatively, one or more components shown in FIG. 10 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications, and may provide the processed signals to the one or more other components of the apparatus 1000. In some aspects, the reception component 1002 may include one or more components of the network node 110, the UE 120, or the sensing device 170 described above in connection with FIG. 1, such as a radio, one or more RF chains, one or more transceivers, or one or more modems, each of which may in turn be coupled with one or more antennas.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications, and may transmit the processed signals to the apparatus 1008. In some aspects, the transmission component 1004 may include one or more components of the network node 110, the UE 120, or the sensing device 170 described above in connection with FIG. 1, such as a radio, one or more RF chains, one or more transceivers, or one or more modems, each of which may in turn be coupled with one or more antennas. In some aspects, the transmission component 1004 may be co-located with the reception component 1002.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may determine a set of parameters for a waveform to be transmitted by the transmitter node, wherein the waveform is to use an allocated bandwidth that is larger than a sweeping bandwidth of an FMCW chirp. The transmission component 1004 may transmit the waveform according to the set of parameters.

The communication manager 1006 may determine the set of parameters based at least in part on an initial set of parameters and a codebook or set of rules.

The transmission component 1004 may transmit information associated with the set of parameters for reception by at least one of a network entity or a receiver node.

The reception component 1002 may receive scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform. The transmission component 1004 may transmit the waveform based at least in part on the scheduling information and according to the set of parameters.

The transmission component 1004 may transmit capability information indicating a capability of the transmitter node with respect to transmission or reception of a waveform including a transition region.

The transmission component 1004 may transmit a transition region configuration information, wherein the one or more parameters are based at least in part on the transition region configuration information transmitted by the transmitter node.

The reception component 1002 may receive information associated with the set of parameters from a network entity.

The communication manager 1006 may determine the set of parameters associated with the waveform.

The transmission component 1004 may transmit information associated with the set of parameters for reception by at least one of a network entity or a receiver node.

The communication manager 1006 may determine the set of parameters based at least in part on approval or modification information associated with an initial set of parameters, associated with the waveform, determined by the transmitter node.

The reception component 1002 may receive feedback or interference information from at least one receiver node.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
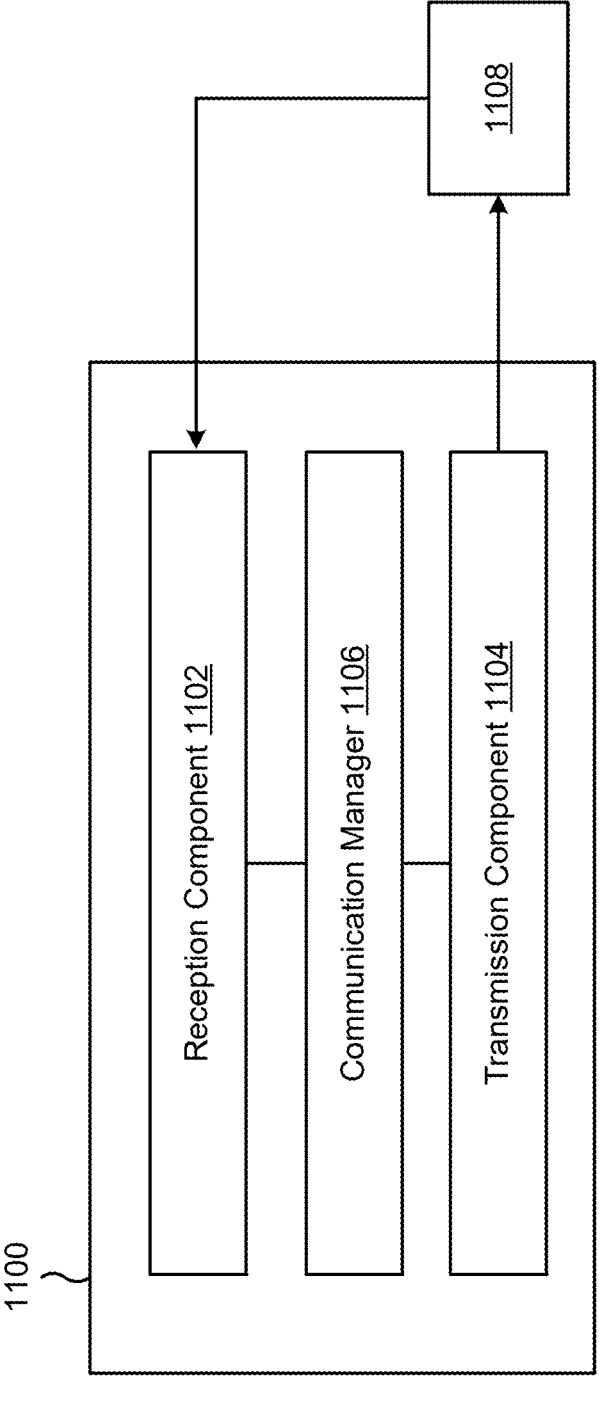
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network entity, or a network entity may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager the communication manager 150 or the communication manager 155 described in connection with FIG. 1. As shown, the apparatus 1100 may communicate with another apparatus 1108, such as a UE or a network node (such as a CU, a DU, an RU, or a base station), using the reception component 1102 and the transmission component 1104. The communication manager 1106 may be included in, or implemented via, a processing system (for example, the processing system 140 or the processing system 145 described in connection with FIG. 1.

In some aspects, the apparatus 1100 may be configured to perform one or more operations described herein in connection with FIGS. 4 and/or FIGS. 5A-5F. Additionally, or alternatively, the apparatus 1100 may be configured to perform one or more processes described herein, such as process 700 of FIG. 7, process 800 of FIG. 8, or a combination thereof. In some aspects, the apparatus 1100 and/or one or more components shown in FIG. 11 may include one or more components of the network entity described in connection with FIG. 1. Additionally, or alternatively, one or more components shown in FIG. 11 may be implemented within one or more components described in connection with FIG. 1. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications, and may provide the processed signals to the one or more other components of the apparatus 1100. In some aspects, the reception component 1102 may include one or more components of the network node 110, the UE 120, or the sensing device 170 described above in connection with FIG. 1, such as a radio, one or more RF chains, one or more transceivers, or one or more modems, each of which may in turn be coupled with one or more antennas.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications, and may transmit the processed signals to the apparatus 1108. In some aspects, the transmission component 1104 may include one or more components of the network node 110, the UE 120, or the sensing device 170 described above in connection with FIG. 1, such as a radio, one or more RF chains, one or more transceivers, or one or more modems, each of which may in turn be coupled with one or more antennas described in connection with FIG. 1. In some aspects, the transmission component 1104 may be co-located with the reception component 1102.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may determine a set of parameters for a waveform to be transmitted by a transmitter node, wherein the waveform is to use an allocated bandwidth that is larger than a sweeping bandwidth of an FMCW chirp. The transmission component 1104 may transmit information associated with the set of parameters for reception by the transmitter node.

The transmission component 1104 may transmit information associated with the set of parameters for reception by one or more receiver nodes.

The communication manager 1106 may determine a set of parameters for a first waveform to be transmitted by a first transmitter node, the set of parameters including one or more parameters for a transition region for the first waveform wherein the transition region is a region of a frequency spectrum of the first waveform in which a power spectral density is less than an average power spectral density of a core region of the frequency spectrum of the first waveform. The transmission component 1104 may transmit scheduling information for the first transmitter node to transmit the first waveform according to the set of parameters.

The transmission component 1104 may transmit scheduling information for scheduling a second transmitter node to transmit a second waveform, wherein a frequency spectrum of the second waveform at least partially overlaps the transition region of the first waveform.

The communication manager 1106 may determine an interference measurement associated with the transition region prior to transmitting the scheduling information for scheduling the second transmitter node to transmit the second waveform.

The reception component 1102 may receive capability information indicating a capability of the first transmitter node with respect to transmission or reception of a waveform including a transition region.

The reception component 1102 may receive transition region configuration information from the first transmitter node, wherein the one or more parameters are determined based at least in part on the transition region configuration information.

The communication manager 1106 may determine an interference measurement associated with the transition region prior to transmitting the scheduling information for scheduling the first transmitter node to transmit the first waveform.

The transmission component 1104 may transmit information associated with the set of parameters for reception by the first transmitter node.

The transmission component 1104 may transmit information associated with the set of parameters for reception by one or more receiver nodes.

The reception component 1102 may receive feedback or interference information from at least one receiver node.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a transmitter node, comprising: determining a set of parameters for a waveform to be transmitted by the transmitter node, wherein the waveform is to use an allocated bandwidth that is larger than a sweeping bandwidth of a frequency modulated continuous wave (FMCW) chirp; and transmitting the waveform according to the set of parameters.

Aspect 2: The method of Aspect 1, wherein the waveform is a sensing waveform.

Aspect 3: The method of any of Aspects 1-2, wherein the waveform is an orthogonal frequency division multiplexing (OFDM)-based waveform.

Aspect 4: The method of any of Aspects 1-3, wherein the FMCW chirp is a linear frequency modulation (LFM) chirp.

Aspect 5: The method of any of Aspects 1-4, wherein the waveform is based at least in part on an enhanced aliased Zadoff-Chu sequence.

Aspect 6: The method of any of Aspects 1-5, wherein the waveform is based at least in part on an enhanced truncated Zadoff-Chu sequence.

Aspect 7: The method of any of Aspects 1-6, wherein the set of parameters includes one or more parameters associated with determining the sweeping bandwidth of the FMCW chirp.

Aspect 8: The method of Aspect 7, wherein the one or more parameters include a parameter indicating an integer number of resource blocks and a parameter indicating a subcarrier spacing.

Aspect 9: The method of Aspect 7, wherein the one or more parameters include a parameter indicating a Zadoff-Chu equivalent integer number of resource blocks and a parameter indicating an expansion factor.

Aspect 10: The method of any of Aspects 1-9, wherein the set of parameters includes one or more parameters associated with determining a time duration of the FMCW chirp.

Aspect 11: The method of Aspect 10, wherein the one or more parameters include a parameter indicating a number of symbol durations.

Aspect 12: The method of Aspect 10, wherein the one or more parameters include a parameter indicating a sequence length.

Aspect 13: The method of any of Aspects 1-12, wherein the set of parameters includes a parameter indicating a sampling time.

Aspect 14: The method of any of Aspects 1-13, wherein the set of parameters includes a parameter indicating a chirp type.

Aspect 15: The method of any of Aspects 1-14, wherein the set of parameters includes a parameter indicating a sampling frequency.

Aspect 16: The method of any of Aspects 1-15, wherein the set of parameters is determined based at least in part on an index indicating a particular set of parameters, the particular set of parameters being one of a plurality of sets of parameters indicated in a codebook table configured on the transmitter node.

Aspect 17: The method of any of Aspects 1-16, wherein the set of parameters is determined based at least in part on an indication indicating a value, the value being one of a plurality of values that are configured on the transmitter node.

Aspect 18: The method of any of Aspects 1-17, wherein the set of parameters includes one or more parameters associated with a rule, associated with generating the waveform, configured on the transmitter node.

Aspect 19: The method of any of Aspects 1-18, wherein the waveform is associated with a time-frequency comb type and a repetition parameter within a coherent processing interval (CPI).

Aspect 20: The method of any of Aspects 1-19, wherein the waveform is associated with a circulant shift.

Aspect 21: The method of any of Aspects 1-20, wherein determining the set of parameters comprises receiving the set of parameters from a network entity.

Aspect 22: The method of any of Aspects 1-21, further comprising determining the set of parameters based at least in part on an initial set of parameters and a codebook or set of rules.

Aspect 23: The method of any of Aspects 1-22, further comprising transmitting information associated with the set of parameters for reception by at least one of a network entity or a receiver node.

Aspect 24: The method of any of Aspects 1-23, wherein the set of parameters includes one or more parameters for a transition region for the waveform, wherein the transition region is a region of a frequency spectrum of the waveform in which a power spectral density is less than an average power spectral density of a core region of the frequency spectrum of the waveform.

Aspect 25: A method of wireless communication performed by a network entity, comprising: determining a set of parameters for a waveform to be transmitted by a transmitter node, wherein the waveform is to use an allocated bandwidth that is larger than a sweeping bandwidth of a frequency modulated continuous wave (FMCW) chirp; and transmitting information associated with the set of parameters for reception by the transmitter node.

Aspect 26: The method of Aspect 25, wherein the waveform is a sensing waveform.

Aspect 27: The method of any of Aspects 25-26, wherein the waveform is an orthogonal frequency division multiplexing (OFDM)-based waveform.

Aspect 28: The method of any of Aspects 25-27, wherein the FMCW chirp is a linear frequency modulation (LFM) chirp.

Aspect 29: The method of any of Aspects 25-28, wherein the waveform is based at least in part on an enhanced aliased Zadoff-Chu sequence.

Aspect 30: The method of any of Aspects 25-29, wherein the waveform is based at least in part on an enhanced truncated Zadoff-Chu sequence.

Aspect 31: The method of any of Aspects 25-30, wherein the set of parameters includes one or more parameters associated with determining the sweeping bandwidth of the FMCW chirp.

Aspect 32: The method of Aspect 31, wherein the one or more parameters include a parameter indicating an integer number of resource blocks and a parameter indicating a subcarrier spacing.

Aspect 33: The method of Aspect 31, wherein the one or more parameters include a parameter indicating a Zadoff-Chu equivalent integer number of resource blocks and a parameter indicating an expansion factor.

Aspect 34: The method of any of Aspects 25-33, wherein the set of parameters includes one or more parameters associated with determining a time duration of the FMCW chirp.

Aspect 35: The method of Aspect 34, wherein the one or more parameters include a parameter indicating a number of symbol durations.

Aspect 36: The method of Aspect 34, wherein the one or more parameters include a parameter indicating a sequence length.

Aspect 37: The method of any of Aspects 25-36, wherein the set of parameters includes a parameter indicating a sampling time.

Aspect 38: The method of any of Aspects 25-37, wherein the set of parameters includes a parameter indicating a chirp type.

Aspect 39: The method of any of Aspects 25-38, wherein the set of parameters includes a parameter indicating a sampling frequency.

Aspect 40: The method of any of Aspects 25-39, wherein the set of parameters is determined based at least in part on an index indicating the set of parameters, the set of parameters being one of a plurality of sets of parameters indicated in a codebook table configured on the transmitter node.

Aspect 41: The method of any of Aspects 25-40, wherein the set of parameters is determined based at least in part on an indication indicating a value, the value being one of a plurality of values that are configured on the transmitter node.

Aspect 42: The method of any of Aspects 25-41, wherein the set of parameters includes one or more parameters associated with a rule, associated with generating the waveform, configured on the transmitter node.

Aspect 43: The method of any of Aspects 25-42, wherein the waveform is associated with a time-frequency comb type and a repetition parameter within a coherent processing interval (CPI).

Aspect 44: The method of any of Aspects 25-43, wherein the waveform is associated with a circulant shift.

Aspect 45: The method of any of Aspects 25-44, wherein the set of parameters is determined based at least in part on receiving a sensing request received from the transmitter node or from a receiver node.

Aspect 46: The method of any of Aspects 25-45, further comprising transmitting information associated with the set of parameters for reception by one or more receiver nodes.

Aspect 47: The method of any of Aspects 25-46, wherein the set of parameters includes one or more parameters for a transition region for the waveform, wherein the transition region is a region of a frequency spectrum of the waveform in which a power spectral density is less than an average power spectral density of a core region of the frequency spectrum of the waveform.

Aspect 48: A method of wireless communication performed by a network entity, comprising: determining a set of parameters for a first waveform to be transmitted by a first transmitter node, the set of parameters including one or more parameters for a transition region for the first waveform, wherein the transition region is a region of a frequency spectrum of the first waveform in which a power spectral density is less than an average power spectral density of a core region of the frequency spectrum of the first waveform; and transmitting scheduling information for the first transmitter node to transmit the first waveform according to the set of parameters.

Aspect 49: The method of Aspect 48, further comprising transmitting scheduling information for scheduling a second transmitter node to transmit a second waveform, wherein a frequency spectrum of the second waveform at least partially overlaps the transition region of the first waveform.

Aspect 50: The method of Aspect 49, wherein the set of parameters are determined so as to reduce performance degradation resulting from scheduling the second transmitter node and the first transmitter node for concurrent transmission.

Aspect 51: The method of Aspect 49, further comprising determining an interference measurement associated with the transition region prior to transmitting the scheduling information for scheduling the second transmitter node to transmit the second waveform.

Aspect 52: The method of any of Aspects 48-51, wherein the network entity includes at least one of a base station, a sensing management function (SnMF), a road-side assistance unit (RSU), or a positioning reference unit (PRU).

Aspect 53: The method of any of Aspects 48-52, wherein the one or more parameters associated with the transition region are determined based at least in part on a set of transition region parameters configured on the network entity according to a wireless communication standard.

Aspect 54: The method of Aspect 53, wherein the set of transition region parameters includes a parameter indicating a maximum permissible signal power allocation associated with the transition region.

Aspect 55: The method of Aspect 53, wherein the set of transition region parameters are configured in association with enabling an error vector magnitude measurement.

Aspect 56: The method of any of Aspects 48-55, further comprising receiving capability information indicating a capability of the first transmitter node with respect to transmission or reception of a waveform including a transition region.

Aspect 57: The method of any of Aspects 48-56, wherein the one or more parameters associated with the transition region include at least one of: a parameter indicating a power level range in the transition region, a parameter indicating a difference between a maximum of a power level range in a first portion of the core region and a minimum of the power level range in the transition region; a parameter indicating a difference between a maximum of a power level range in a second portion of the core region and the minimum of the power level range in the transition region; a parameter indicating a difference between a maximum of the power level range in the transition region and a minimum of the power level range in the first portion of the core region; or a parameter indicating a difference between a maximum of the power level range in the transition region and a minimum of the power level range in the second portion of the core region.

Aspect 58: The method of Aspect 57, wherein the one or more parameters further include a slope associated with the power level range in the transition region.

Aspect 59: The method of any of Aspects 48-58, wherein the one or more parameters associated with the transition region include at least one of: a parameter indicating a power level range in at least a region comprising a second portion of the core region and the transition region, a parameter indicating a difference between a maximum of a power level range in a first portion of the core region and a minimum of the power level range in the region comprising the second portion of the core region and the transition region; or a parameter indicating a difference between a maximum of the power level range in the region comprising a second portion of the core region and the transition region and a minimum of the power level range in the first portion of the core region.

Aspect 60: The method of any of Aspects 48-59, wherein the set of parameters includes one or more parameters for a second transition region for the first waveform.

Aspect 61: The method of any of Aspects 48-60, further comprising receiving transition region configuration information from the first transmitter node, wherein the one or more parameters are determined based at least in part on the transition region configuration information.

Aspect 62: The method of any of Aspects 48-61, further comprising determining an interference measurement associated with the transition region prior to transmitting the scheduling information for scheduling the first transmitter node to transmit the first waveform.

Aspect 63: The method of any of Aspects 48-62, further comprising transmitting information associated with the set of parameters for reception by the first transmitter node.

Aspect 64: The method of any of Aspects 48-63, further comprising transmitting information associated with the set of parameters for reception by one or more receiver nodes.

Aspect 65: The method of any of Aspects 48-64, further comprising receiving feedback or interference information from at least one receiver node.

Aspect 66: The method of any of Aspects 48-65, wherein the waveform is to use an allocated bandwidth that is larger than a sweeping bandwidth of a frequency modulated continuous wave (FMCW) chirp.

Aspect 67: A method of wireless communication performed by a transmitter node, comprising: receiving scheduling information associated with transmitting a waveform according to a set of parameters, wherein the set of parameters includes one or more parameters for a transition region for the waveform, wherein the transition region is a region of a frequency spectrum of the waveform in which a power spectral density is less than an average power spectral density of a core region of the frequency spectrum of the waveform; and transmitting the waveform based at least in part on the scheduling information and according to the set of parameters.

Aspect 68: The method of Aspect 67, wherein the transmitter node includes at least one of a user equipment (UE), a base station, a road-side assistance unit (RSU), or a positioning reference unit (PRU).

Aspect 69: The method of any of Aspects 67-68, wherein the one or more parameters associated with the transition region are based at least in part on a set of transition region parameters configured on the transmitter node according to a wireless communication standard.

Aspect 70: The method of Aspect 69, wherein the set of transition region parameters includes a parameter indicating a maximum permissible signal power allocation associated with the transition region.

Aspect 71: The method of Aspect 69, wherein the set of transition region parameters are configured in association with enabling an error vector magnitude measurement.

Aspect 72: The method of any of Aspects 67-71, further comprising transmitting capability information indicating a capability of the transmitter node with respect to transmission or reception of a waveform including a transition region.

Aspect 73: The method of any of Aspects 67-72, wherein the one or more parameters associated with the transition region include at least one of: a parameter indicating a power level range in the transition region, a parameter indicating a difference between a maximum of a power level range in a first portion of the core region and a minimum of the power level range in the transition region; a parameter indicating a difference between a maximum of a power level range in a second portion of the core region and the minimum of the power level range in the transition region; a parameter indicating a difference between a maximum of the power level range in the transition region and a minimum of the power level range in the first portion of the core region; or a parameter indicating a difference between a maximum of the power level range in the transition region and a minimum of the power level range in the second portion of the core region.

Aspect 74: The method of Aspect 73, wherein the one or more parameters further include a slope associated with the power level range in the transition region.

Aspect 75: The method of any of Aspects 67-74, wherein the one or more parameters associated with the transition region include at least one of: a parameter indicating a power level range in at least a region comprising a second portion of the core region and the transition region, a parameter indicating a difference between a maximum of a power level range in a first portion of the core region and a minimum of the power level range in the region comprising the second portion of the core region and the transition region; or a parameter indicating a difference between a maximum of the power level range in the region comprising a second portion of the core region and the transition region and a minimum of the power level range in the first portion of the core region.

Aspect 76: The method of any of Aspects 67-75, wherein the set of parameters includes one or more parameters for a second transition region for the waveform.

Aspect 77: The method of any of Aspects 67-76, further comprising transmitting a transition region configuration information, wherein the one or more parameters are based at least in part on the transition region configuration information transmitted by the transmitter node.

Aspect 78: The method of any of Aspects 67-77, further comprising receiving information associated with the set of parameters from a network entity.

Aspect 79: The method of any of Aspects 67-78, further comprising: determining the set of parameters associated with the waveform, and transmitting information associated with the set of parameters for reception by at least one of a network entity or a receiver node.

Aspect 80: The method of any of Aspects 67-79, further comprising determining the set of parameters based at least in part on approval or modification information associated with an initial set of parameters, associated with the waveform, determined by the transmitter node.

Aspect 81: The method of any of Aspects 67-80, further comprising receiving feedback or interference information from at least one receiver node.

Aspect 82: The method of any of Aspects 67-81, wherein the waveform is to use an allocated bandwidth that is larger than a sweeping bandwidth of a frequency modulated continuous wave (FMCW) chirp.

Aspect 83: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-82.

Aspect 84: An apparatus for wireless communication at a device, the apparatus comprising one or more memories and one or more processors coupled to the one or more memories, the one or more processors configured to cause the device to perform the method of one or more of Aspects 1-82.

Aspect 85: An apparatus for wireless communication, the apparatus comprising at least one means for performing the method of one or more of Aspects 1-82.

Aspect 86: A non-transitory computer-readable medium storing code for wireless communication, the code comprising instructions executable by one or more processors to perform the method of one or more of Aspects 1-82.

Aspect 87: A non-transitory computer-readable medium storing a set of instructions for wireless communication, the set of instructions comprising one or more instructions that, when executed by one or more processors of a device, cause the device to perform the method of one or more of Aspects 1-82.

Aspect 88: A device for wireless communication, the device comprising a processing system that includes one or more processors and one or more memories coupled with the one or more processors, the processing system configured to cause the device to perform the method of one or more of Aspects 1-82.

Aspect 89: An apparatus for wireless communication at a device, the apparatus comprising one or more memories and one or more processors coupled to the one or more memories, the one or more processors individually or collectively configured to cause the device to perform the method of one or more of Aspects 1-82.

The foregoing disclosure provides illustration and description but is not intended to be exhaustive or to limit the aspects to the precise forms disclosed. Modifications and variations may be made in light of the above disclosure or may be acquired from practice of the aspects. No element, act, or instruction described herein should be construed as critical or essential unless explicitly described as such.

It will be apparent that systems or methods described herein may be implemented in different forms of hardware or a combination of hardware and software. The actual specialized control hardware or software used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, the articles "a" and "an" are intended to refer to one or more items and may be used interchangeably with "one or more" or "at least one." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or "a single one" or similar language is used. Also, as used herein, the terms "has," "have," "having," "comprise," "comprising," "include" and "including," and derivatives thereof or similar terms are intended to be open-ended terms that do not limit an element that they modify (for example, an element "having" A may also have B). Also, as used herein, the term "or" is intended to be inclusive when used in a series and may be used interchangeably with "and/or," unless explicitly stated otherwise (for example, if used in combination with "either" or "only one of"). As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

As used herein, the term "determine" or "determining" encompasses a wide variety of actions and, therefore, "determining" can include calculating, computing, processing, deriving, estimating, investigating, looking up (such as via looking up in a table, a database, or another data structure), searching, inferring, ascertaining, and/or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing, and/or other such similar actions.

As used herein, the phrase "based on" is intended to mean "based at least in part on" or "based on or otherwise in association with" unless explicitly stated otherwise. As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the scope of all aspects described herein. Many of these features may be combined in ways not specifically recited in the claims or disclosed in the specification. The disclosure of various aspects includes each dependent claim in combination with every other claim in the claim set.

What is claimed is:

1. A transmitter node for wireless communication, the transmitter node comprising:

one or more memories; and one or more processors, coupled to the one or more memories, configured to cause the transmitter node to:

determine a set of parameters for a waveform to be transmitted by the transmitter node, wherein the waveform is to utilize an allocated bandwidth that is larger than a sweeping bandwidth of a frequency modulated continuous wave (FMCW) chirp; and transmit the waveform according to the set of parameters.

2. The transmitter node of claim 1, wherein the waveform is a sensing waveform.

3. The transmitter node of claim 1, wherein the waveform is an orthogonal frequency division multiplexing (OFDM)-based waveform.

4. The transmitter node of claim 1, wherein the FMCW chirp is a linear frequency modulation (LFM) chirp.

5. The transmitter node of claim 1, wherein the waveform is based at least in part on an enhanced aliased Zadoff-Chu sequence.

6. The transmitter node of claim 1, wherein the waveform is based at least in part on an enhanced truncated Zadoff-Chu sequence.

7. The transmitter node of claim 1, wherein the set of parameters includes one or more parameters associated with determining the sweeping bandwidth of the FMCW chirp.

8. The transmitter node of claim 7, wherein the one or more parameters include a parameter indicating an integer number of resource blocks and a parameter indicating a subcarrier spacing.

9. The transmitter node of claim 7, wherein the one or more parameters include a parameter indicating a Zadoff-Chu equivalent integer number of resource blocks and a parameter indicating an expansion factor.

10. The transmitter node of claim 1, wherein the set of parameters includes one or more parameters associated with determining a time duration of the FMCW chirp.

11. The transmitter node of claim 10, wherein the one or more parameters include a parameter indicating a number of symbol durations.

12. The transmitter node of claim 10, wherein the one or more parameters include a parameter indicating a sequence length.

13. The transmitter node of claim 1, wherein the set of parameters includes a parameter indicating a sampling time.

14. The transmitter node of claim 1, wherein the set of parameters includes a parameter indicating a chirp type.

15. The transmitter node of claim 1, wherein the set of parameters includes a parameter indicating a sampling frequency.

16. The transmitter node of claim 1, wherein the set of parameters is determined based at least in part on an index indicating a particular set of parameters, the particular set of parameters being one of a plurality of sets of parameters indicated in a codebook table configured on the transmitter node.

17. The transmitter node of claim 1, wherein the set of parameters is determined based at least in part on an indication indicating a value, the value being one of a plurality of values that are configured on the transmitter node.

18. The transmitter node of claim 1, wherein the set of parameters includes one or more parameters associated with a rule, associated with generating the waveform, configured on the transmitter node.

19. The transmitter node of claim 1, wherein the waveform is associated with a time-frequency comb type and a repetition parameter within a coherent processing interval (CPI).

20. The transmitter node of claim 1, wherein the waveform is associated with a circulant shift.

21. The transmitter node of claim 1, wherein the one or more processors, to determine the set of parameters, are configured to cause the transmitter node to receive the set of parameters from a network entity.

22. The transmitter node of claim 1, wherein the one or more processors are configured to cause the transmitter node to determine the set of parameters based at least in part on an initial set of parameters and a codebook or set of rules.

23. The transmitter node of claim 1, wherein the one or more processors are further configured to cause the transmitter node to transmit information associated with the set of parameters for reception by at least one of a network entity or a receiver node.

24. The transmitter node of claim 1, wherein the set of parameters includes one or more parameters for a transition region for the waveform, and wherein the transition region is a region of a frequency spectrum of the waveform in which a power spectral density is less than an average power spectral density of a core region of the frequency spectrum of the waveform.

25. A network entity for wireless communication, the network entity comprising:

one or more memories; and one or more processors, coupled to the one or more memories, configured to cause the network entity to:

determine a set of parameters for a waveform to be transmitted by a transmitter node, wherein the waveform is to utilize an allocated bandwidth that is larger than a sweeping bandwidth of a frequency modulated continuous wave (FMCW) chirp; and transmit information associated with the set of parameters for reception by the transmitter node.

26. The network entity of claim 25, wherein the set of parameters is determined based at least in part on receiving a sensing request received from the transmitter node or from a receiver node.

27. The network entity of claim 25, wherein the one or more processors are further configured to cause the network entity to transmit information associated with the set of parameters for reception by one or more receiver nodes.

28. The network entity of claim 25, wherein the set of parameters includes one or more parameters for a transition region for the waveform, and wherein the transition region is a region of a frequency spectrum of the waveform in which a power spectral density is less than an average power spectral density of a core region of the frequency spectrum of the waveform.

29. A method of wireless communication performed by a transmitter node, the method comprising:

determining a set of parameters for a waveform to be transmitted by the transmitter node, wherein the waveform is to utilize an allocated bandwidth that is larger than a sweeping bandwidth of a frequency modulated continuous wave (FMCW) chirp; and transmitting the waveform according to the set of parameters.

30. A method of wireless communication performed by a network entity, the method comprising:

determining a set of parameters for a waveform to be transmitted by a transmitter node, wherein the waveform is to utilize an allocated bandwidth that is larger than a sweeping bandwidth of a frequency modulated continuous wave (FMCW) chirp; and transmitting information associated with the set of parameters for reception by the transmitter node.

\* \* \* \* \*